United States Patent

Tanuma

Patent Number: 5,541,765
Date of Patent: Jul. 30, 1996

[54] WAVELENGTH CONVERSION DEVICE

[76] Inventor: Ryohei Tanuma, 1-3-2, Highland, Yokosuka-shi, Kanagawa, Japan, 239

[21] Appl. No.: 238,711

[22] Filed: May 5, 1994

Related U.S. Application Data

[60] Division of Ser. No. 593,667, Oct. 5, 1990, Pat. No. 5,355,246, which is a continuation-in-part of Ser. No. 420,534, Oct. 12, 1989, Pat. No. 5,173,799.

[30] Foreign Application Priority Data

Oct. 12, 1988 [JP] Japan .................. 63-25655
Oct. 5, 1989 [JP] Japan .................. 1-260568

[51] Int. Cl.⁶ .................. H03F 7/00; G02F 1/35; H01S 3/10
[52] U.S. Cl. .................. 359/328; 359/330; 372/21; 372/22; 385/122
[58] Field of Search .................. 372/21, 22, 101; 359/326, 328, 330; 385/122

[56] References Cited

U.S. PATENT DOCUMENTS

| | | | |
|---|---|---|---|
| 3,414,836 | 12/1968 | Clark et al. | 372/101 |
| 3,581,228 | 5/1971 | Smith | 372/101 |
| 3,622,739 | 11/1971 | Steffen | 372/101 |
| 3,735,283 | 5/1973 | Wuerker et al. | 372/101 |
| 3,799,680 | 3/1974 | Weisner | 359/381 |
| 3,863,177 | 1/1975 | Damen et al. | 372/101 |
| 4,068,190 | 1/1978 | Ferguson | 372/22 |
| 4,200,808 | 4/1980 | Herbst | 359/328 |
| 4,866,730 | 9/1989 | Szatmari et al. | 372/101 |
| 4,884,276 | 11/1989 | Dixon et al. | 359/326 |
| 4,910,740 | 3/1990 | Oka | 372/22 |
| 5,173,799 | 12/1992 | Tanuma | 359/328 |
| 5,355,246 | 10/1994 | Tanuma | 359/328 |

*Primary Examiner*—Ricky D. Shafer

[57] ABSTRACT

A change in the wavelength of a laser beam is achieved by causing the beam to have a conical wavefront and applying it to a nonlinear crystal so that the beam converges along the center axis producing an output beam of a different wavelength. The conical wavefront is achieved in wavefront conversion means by use of lenses, mirrors and crystals with conical surfaces. Adjustability is provided by diverging the beam first and then converging it, with adjustment in the spacing between the divergence means and convergence means of a wavefront conversion means.

18 Claims, 11 Drawing Sheets

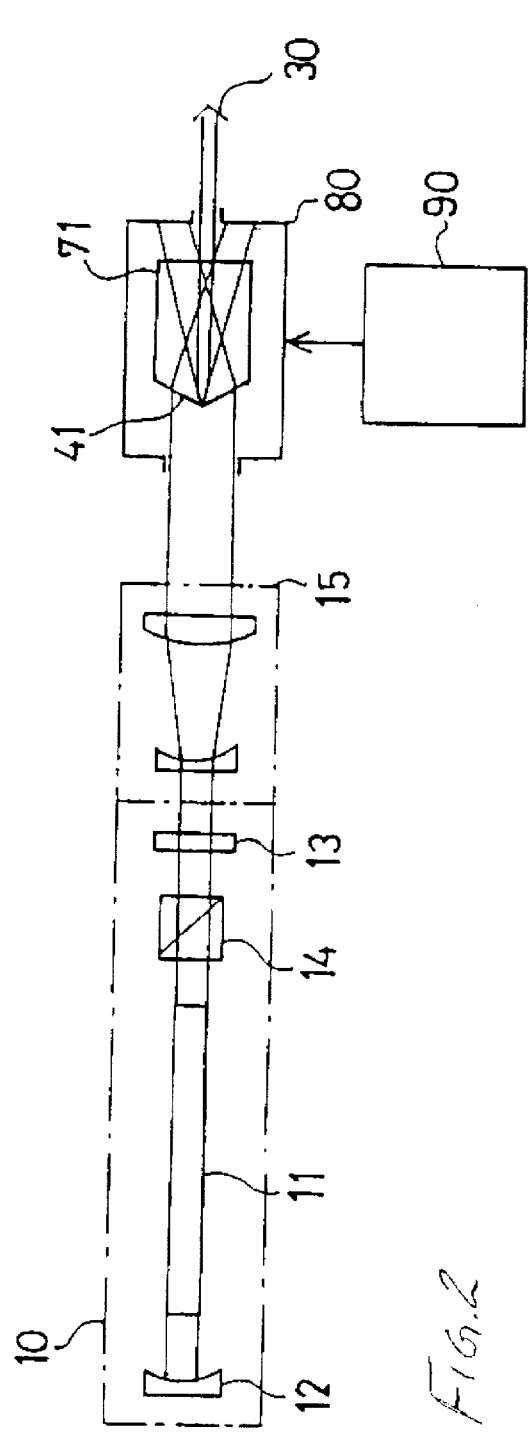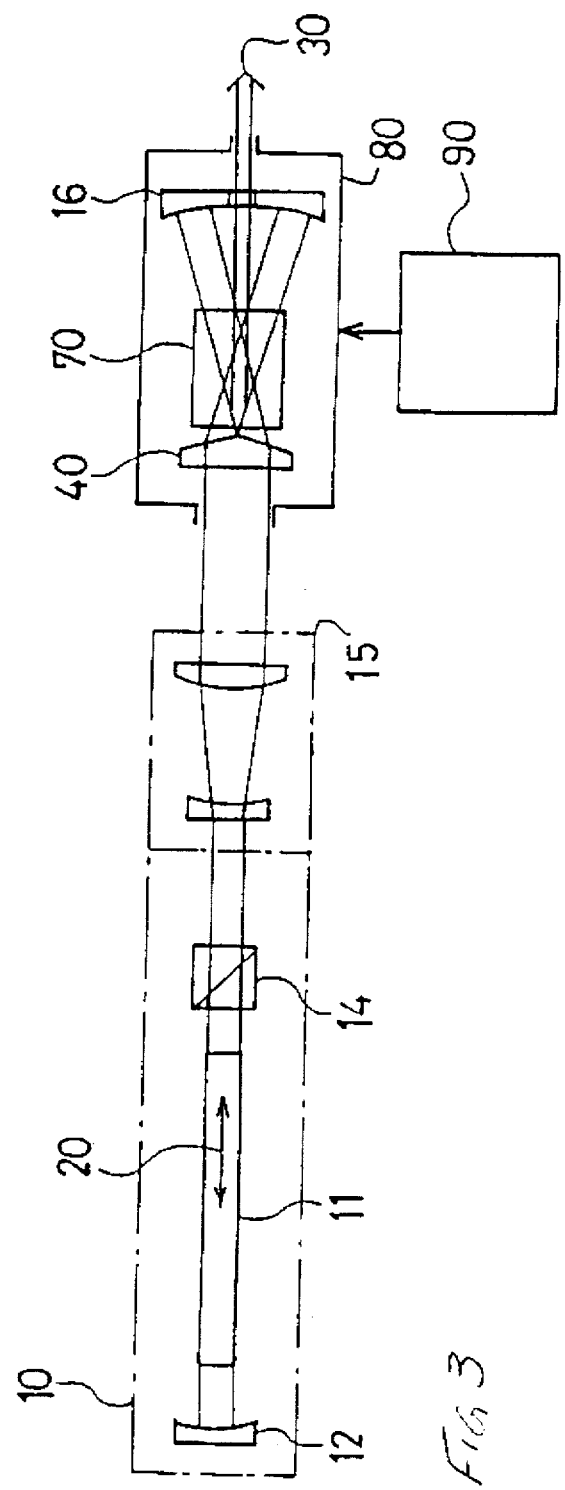

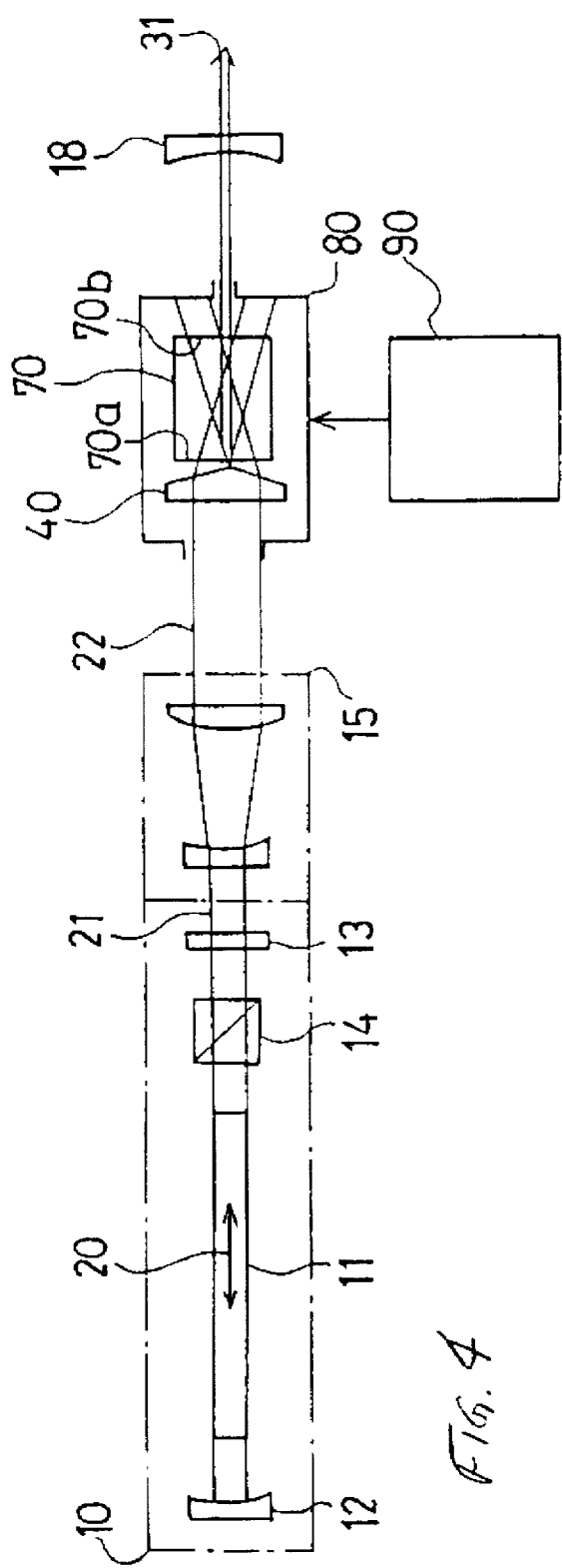
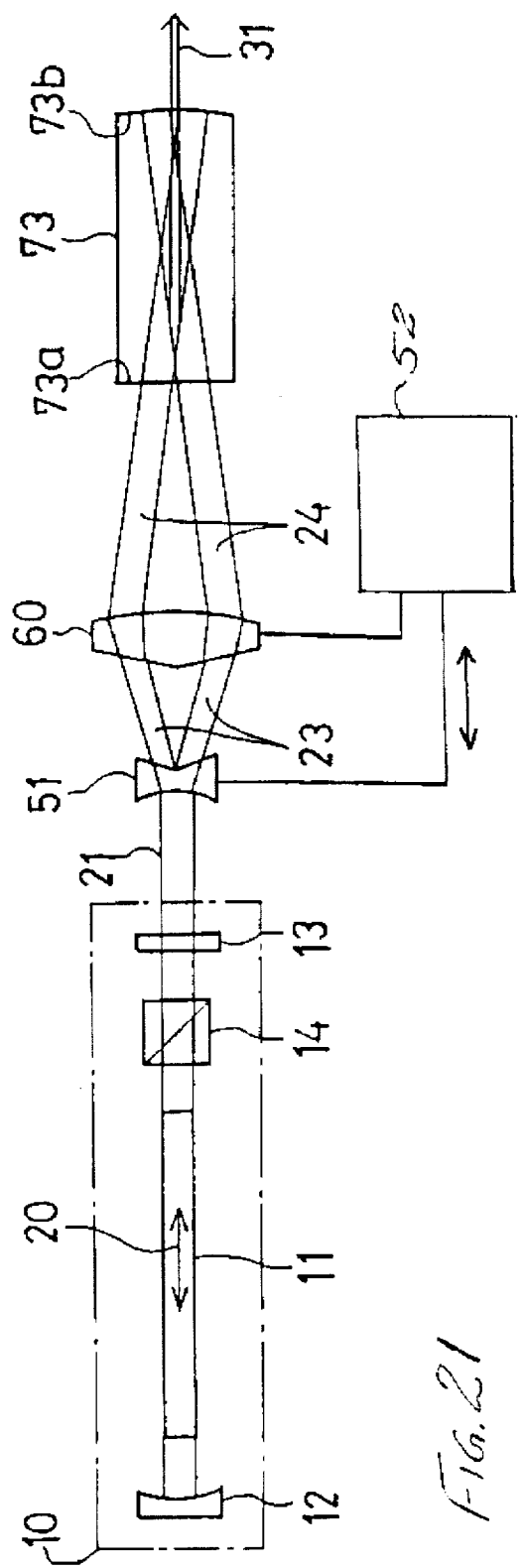

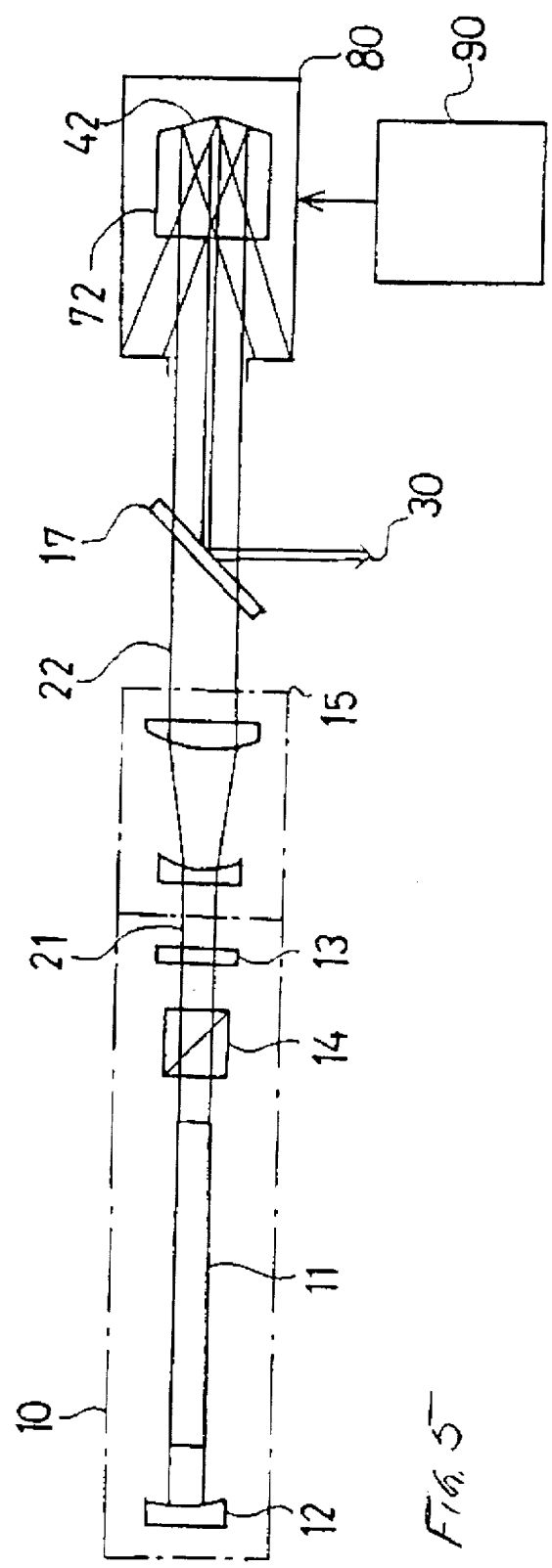
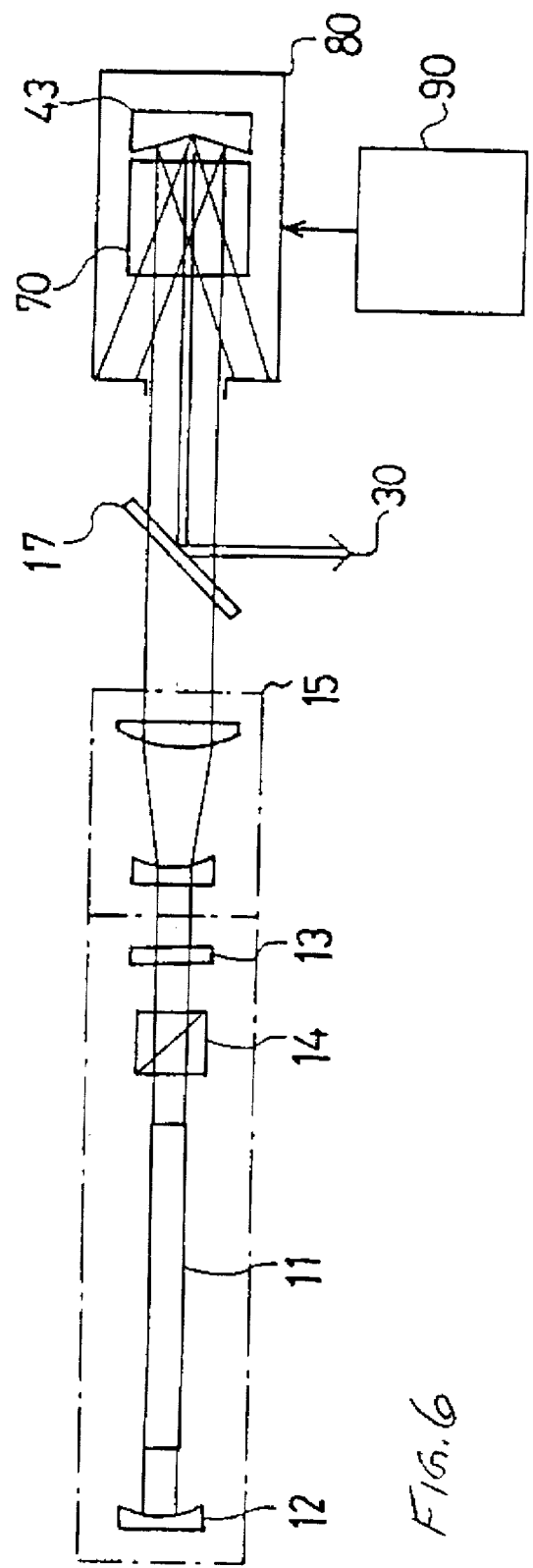
FIG. 5
FIG. 6

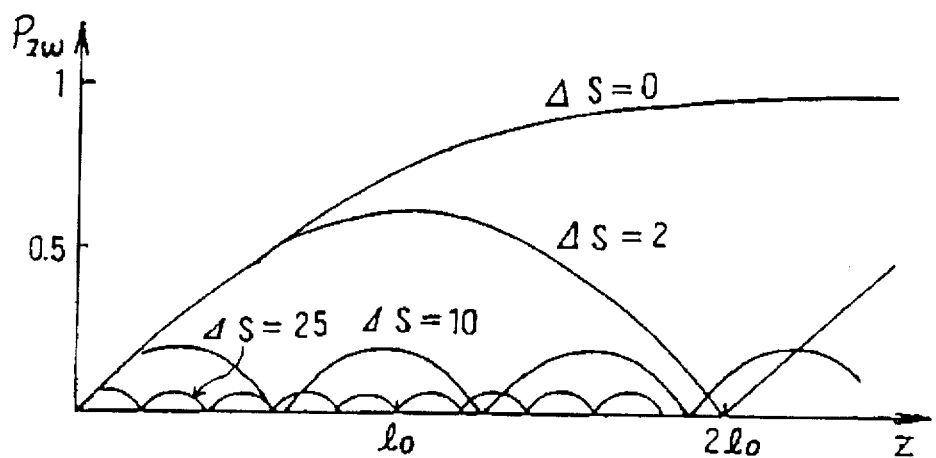
FIG. 7
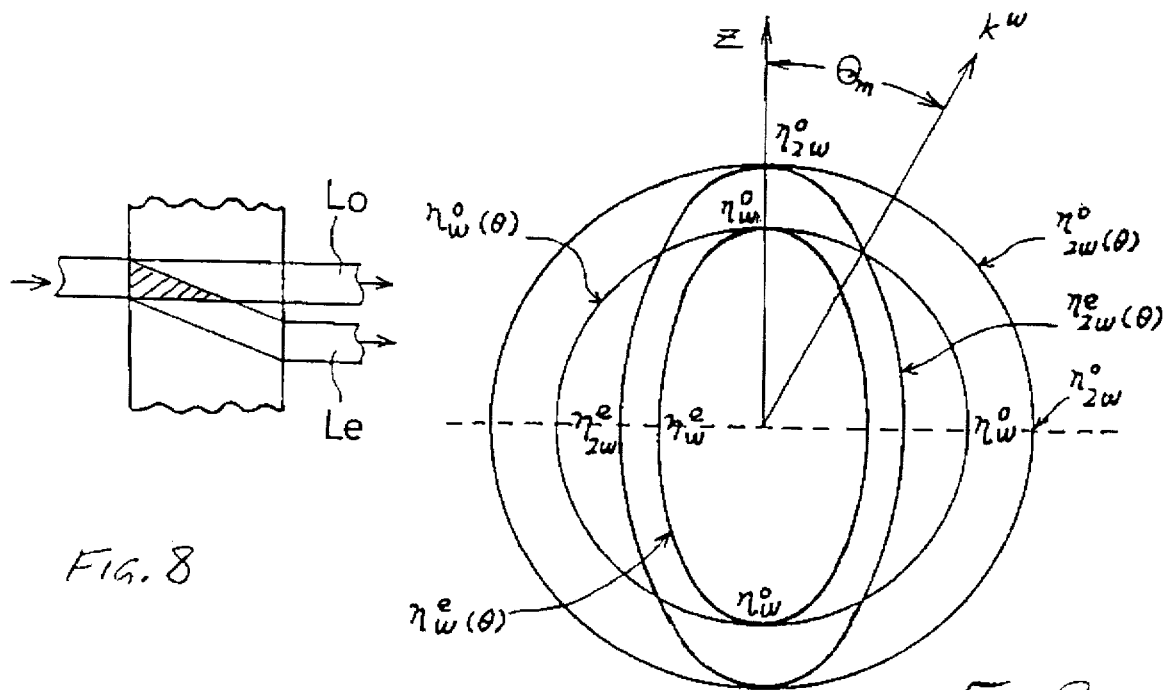
FIG. 8
FIG. 9
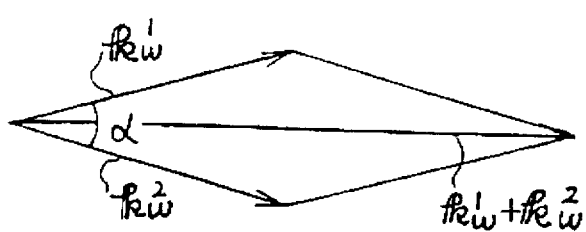
FIG. 10

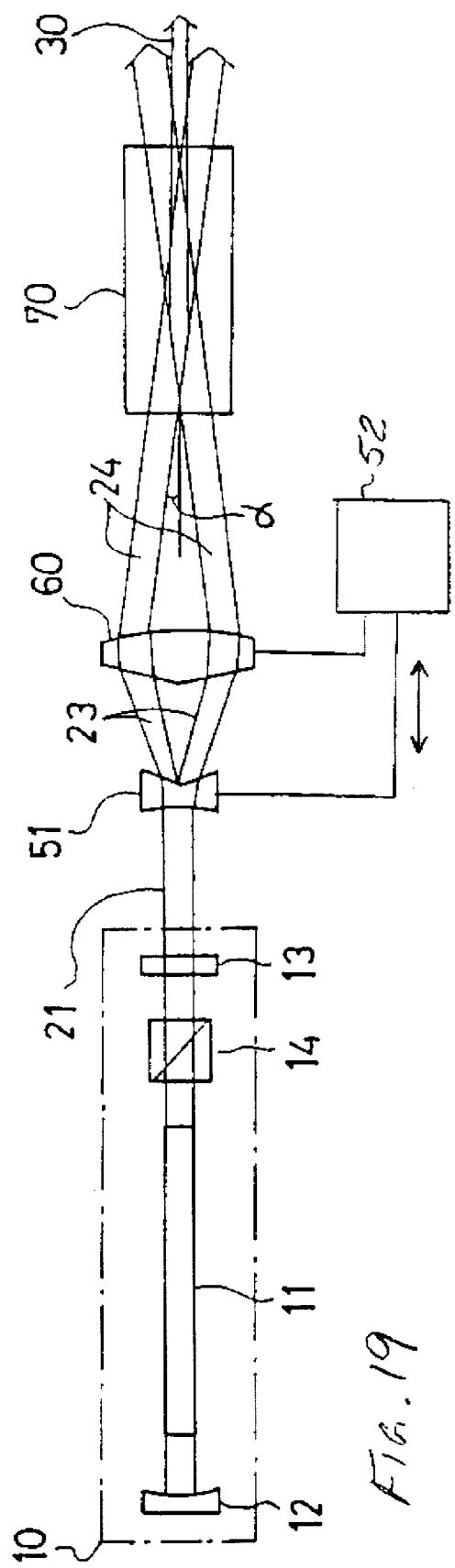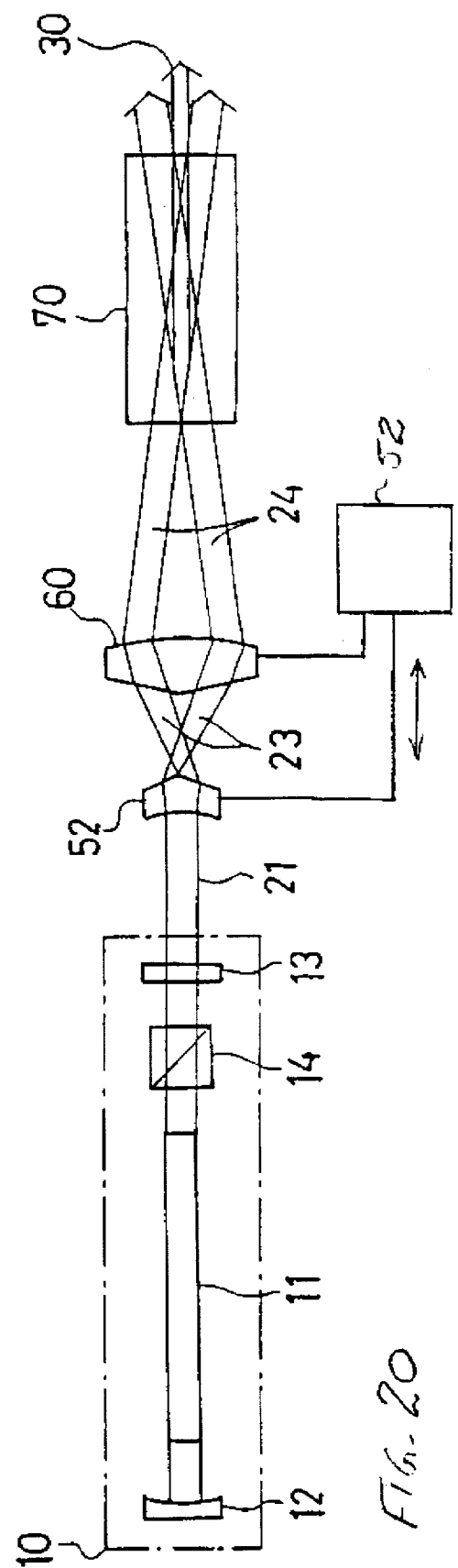

WAVELENGTH CONVERSION DEVICE

This application is a division of application Ser. No. 07/593,667, filed on Oct. 5, 1990 now U.S. Pat. No. 5,355,246, which is a continuation-in-part of Ser. No. 420,534 filed Oct. 12, 1989 now U.S. Pat. No. 5,173,799.

BACKGROUND OF THE INVENTION

The present invention relates to a wavelength conversion device in which a laser beam is applied on a nonlinear optical medium so as to obtain a beam of a different wavelength.

In the prior art, the laser generates a coherent beam of sharp directivity and is widely applied in various fields such as material processing and measurement fields. Recently, it has also been applied in medical and chemical industry fields. However, with the exception of some types, the laser vibrates or oscillates only at a specific wavelength which results in one of the most serious obstacles to its applications. Wavelength conversion techniques using various kinds of nonlinear optical materials (which are also used in the present invention) are known in the prior art. The principles of the prior art techniques will be explained in the following paragraphs.

In such prior art approaches, when two laser beams having different frequencies enter a nonlinear optical crystal, a polarized wave having an intensity which is proportional to the product of the electric fields of these two laser beams is generally generated in the interior of the crystal in addition to polarized waves having intensities which are proportional so the respective laser beams. Since a polarized wave having an intensity which is proportional to the product of the electric fields has a frequency corresponding to the sum of the frequencies of both laser beams, it is possible, by extracting this polarized wave, to convert the laser beam into a beam having a frequency or a wavelength different from that of the original beam. This is the principle of wavelength conversion which is called frequency sum generation. A known form of wavelength conversion called second harmonic generation (hereinunder referred to as "SHG") is particularly important in practical use. This is a system for converting two laser beams having the same frequency, namely a single laser beam, into a beam having twice the frequency or half the wavelength of the original beam, by projecting the laser beam onto a nonlinear optical crystal.

The concept of converse wavelength conversion, namely, converting a laser beam into two laser beams having the frequencies the sum of which is equal to the frequency of the original beam by projecting the laser beam onto a nonlinear optical crystal is also known. In this case, the nonlinear optical crystal is generally incorporated into a resonator and both or either of the two converted beams is extracted by oscillation under a controlled oscillating condition. This is called an optical parametric oscillation (hereinunder referred to as "OPO") system.

In both SHG and OPO systems, it is necessary that the laser beam and the converted beam travel in phase with each other in order to enhance the wavelength conversion efficiency. This is called phase matching. For example, in the SHG system the fundamental wave, which is a polarized wave having the same frequency as the incident laser beam, and a second harmonic wave, which is a polarized wave having twice as large a frequency as the incident laser beam, are caused to travel in the same direction with the phases matched with each other. For this purpose, the velocities of both waves and, hence, the refractive indexes of the nonlinear optical crystal with respect to those waves must be the same. Ordinarily, however, the higher the frequency of light, the higher the refractive index, so that the phase matching condition is generally not able to be satisfied.

There is also known a phase matching method utilizing the optical anisotropy of a crystal. Light is split into an ordinary ray and an extraordinary ray when travelling in an optically anisotropical crystal, and the refractive index of the ordinary ray does not depend upon the direction of travel but the refractive index of the extraordinary ray depends upon the direction of travel. This phenomenon is utilized for selecting the angle of incidence of a laser beam so that the refractive indexes of the laser beam with respect to the fundamental wave and the second harmonic wave are the same. This method is called an angle phase matching method.

This method, however, has disadvantages in that the phase matching condition is influenced by the double refraction of an optical crystal. To solve this problem, the angle of incidence of a laser beam with respect to a nonlinear optical crystal is fixed at 90° with respect to the optical axis so as to prevent the generation of double refraction, and the phase is matched by utilizing the temperature dependence of the refractive indexes of an ordinary ray and an extraordinary ray by adjusting the temperature of the nonlinear optical crystal. This method is called temperature phase matching.

In these conventional methods, there are two types of phase matching conditions. In a phase matching condition of type I, the fundamental wave is assumed as an ordinary ray while the second harmonic wave is assumed as an extraordinary ray. On the other hand, in a phase matching condition of type II, the fundamental wave is assumed as an extraordinary ray while the second harmonic wave is assumed as an ordinary ray. Note that hereinafter "ordinary" and "extraordinary" rays are also referred to as "normal" and "abnormal" rays, respectively.

Details of the theoretical basis of wavelength conversion and phase matching as described above, as well as certain other prior art techniques, will be described in the following section.

TECHNICAL DESCRIPTION OF BASIC TECHNIQUES

Generally, when a beam is applied on a transparent crystal, dipoles are excited by polarization due to a vibrating electric field and the vibrating dipoles generate a new beam. The relationship between the polarization $\vec{p}$ and the electric field $\vec{E}$ is expressed by:

$$\vec{p} = \vec{p}_L + \vec{p}_{NL}$$

$$\vec{p}_L = \chi^{(1)} \cdot \vec{E}$$

$$\vec{p}_{NL} = \chi^{(2)} : \vec{E} \cdot \vec{E} \cdot \vec{E} + \ldots \quad (1)$$

wherein $\vec{p}_L$ is a linear polarization, $\vec{p}_{NL}$ is a nonlinear polarization and $\chi^{(1)}$, $\chi^{(2)}$, $\chi^{(3)}$ are primary, secondary and tertiary polarizations, respectively. Generally, a high order polarization is smaller than $\chi^{(1)}$ and therefore, the higher order terms in the equation (1) may be disregarded in the case of a normal beam. However, when the laser beam is powerful and has a large $\vec{E}$-value, a higher order polarization is present. Especially, as the secondary term is larger than the tertiary term and downward, we will express $\vec{P}_{NL}$ in the following equation by secondary terms only. Accordingly, when $$\vec{P}_{NL} = (P_x, P_y, P_z)^T, \qquad (2)$$
$$\vec{E} = (E_x, E_y, E_z)^T,$$

$$\vec{P}_{NL} = \begin{vmatrix} P_x \\ P_y \\ P_z \end{vmatrix} = \begin{vmatrix} d_{11} & d_{12} & d_{13} & d_{14} & d_{15} & d_{16} \\ d_{21} & d_{22} & d_{23} & d_{24} & d_{25} & d_{26} \\ d_{31} & d_{32} & d_{33} & d_{34} & d_{35} & d_{36} \end{vmatrix} \begin{vmatrix} E_x^2 \\ E_y^2 \\ E_z^2 \\ 2E_yE_z \\ 2E_xE_z \\ 2E_xE_y \end{vmatrix}$$

will follow and in this equation, the x, y and z axes are taken in the direction of axis of the crystal and the z-axis is taken in the direction of the optical axis, and $d_{11}$ $d_{12}$ ... represent the nonlinear optical constants of the optical crystal.

Now, assuming that there are two electric fields $\vec{E}_1$ and $\vec{E}_2$ having angular frequencies $\omega_1$, $\omega_2$ present in a crystal, and in that case, if $$\vec{E} = \vec{E}_1 + \vec{E}_2$$

$$\vec{E}_1 = \vec{E}_{10} \cos(\omega_1 t - \vec{k}_1 \cdot \vec{r} + \phi_1) \qquad (3)$$

$$\vec{E}_2 = \vec{E}_{20} \cos(\omega_2 t - \vec{k}_2 \cdot \vec{r} + \phi_2)$$

then the following equation will follow:

$$\begin{aligned}\vec{E} \cdot \vec{E} &= (\vec{E}_1 + \vec{E}_2) \cdot (\vec{E}_1 + \vec{E}_2) \qquad (4) \\ &= \vec{E}_{10}^2 \cos^2(\omega_1 t - \vec{k}_1 \cdot \vec{r} + \theta_1) + \\ &\quad \vec{E}_{20}^2 \cos^2(\omega_2 t - \vec{k}_2 \cdot \vec{r} + \theta_2) + \\ &\quad 2\vec{E}_{10} \cdot \vec{E}_{20}^2 \cos(\omega_1 t - \vec{k}_1 \cdot \vec{r} + \\ &\quad \theta_1)\cos(\omega_2 t - \vec{k}_2 \cdot \vec{r} + \theta_2)\end{aligned}$$

wherein $\vec{r}$ is a position vector, $\vec{k}_1$, $\vec{k}_2$ are wave number vectors and $\phi_1$, $\phi_2$ are phase angles. These terms can be rewritten as follows:

$$\cos^2(\omega_{io} t - \vec{k}_i \cdot \vec{r} + \theta_i) = \qquad (5)$$
$$\frac{1}{2}\{1 + \cos(2\omega_i t - 2\vec{k}_i \cdot \vec{r} + 2\theta_i)\}(i = 1, 2)$$

$$\cos(\omega_1 t - \vec{k}_1 \cdot \vec{r} + \theta_1)\cos(\omega_2 t - \vec{k}_2 \cdot \vec{r} + \theta_2) = \qquad (6)$$
$$\frac{1}{2}\{\cos\{(\omega_1 - \omega_2)t - (\vec{k}_1 - \vec{k}_2) \cdot \vec{r} + \theta_1 - \theta_2\} + $$
$$\cos\{(\omega_1 + \omega_2)t - (\vec{k}_1 + \vec{k}_2)\vec{r} + \theta_1 + \theta_2\}\}$$

As a result, the nonlinear polarization $\vec{P}_{NL}$ may be divided into frequency components $$0, 2\omega_1, \omega_1 - \omega_2, \omega_1 + \omega_2, 2\omega_2.$$

Of these components, the zero frequency component, that is, a DC component, means the rectification of an optical frequency electromagnetic wave in the nonlinear medium. Further, the $2\omega_2$ and $2\omega_2$ components are polarizations for causing second harmonic generation, $\omega_1 - \omega_2$ are those for causing differential frequency generation $\omega_1 + \omega_2$ are those for causing sum frequency generation, respectively. However, it does not always follow that beams generate from all of these polarization waves of different frequencies; the kinds of frequency beams generated from the polarization waves depend on the phase matching conditions to be described below. Further, not only the incident beam, but also the interaction between it and the beam actually generated must be taken into consideration.

Assuming that a third beam of angular frequency $\omega_3$ generates from the above two beams and the electric field thereof is $\vec{E}_3$, the entire electric field will be:

$$\vec{E} = \vec{E}_1 + \vec{E}_2 + \vec{E}_3 \qquad (7)$$

and accordingly, the secondary nonlinear polarization will include a total of nine frequency components as expressed by the following equation:

$$\vec{P}_{NL} = \chi^{(2)} : \vec{E} \cdot \vec{E} = \vec{P}^{(2\omega_1)} + \vec{P}^{(2\omega_2)} + \vec{P}^{(2\omega_3)} + \vec{P}^{(\omega_1 - \omega_2)} + \qquad (8)$$
$$\vec{P}^{(\omega_3 - \omega_2)} + \vec{P}^{(\omega_3 - \omega_1)} + \vec{P}^{(\omega_1 + \omega_2)} + \vec{P}^{(\omega_3 + \omega_2)} + \vec{P}^{(\omega_3 + \omega_1)}$$

Where the generated beam is of a sum frequency $\omega_3 = \omega_1 + \omega_2$, $\vec{P}^{(\omega_3 - \omega_2)} = \vec{P}^{(\omega_1)}$, $\vec{P}^{(\omega_3 - \omega_1)} = \vec{P}^{(\omega_2)}$, $\vec{P}^{(\omega_1 + \omega_2)} = \vec{P}^{(\omega_3)}$ will follow so that the term $\vec{E}_1$ is derived from the terms $\vec{E}_3$ and $\vec{E}_2$ the term $\vec{E}_2$ from the terms $\vec{E}_3$ and $\vec{E}_1$ and the term $\vec{E}_3$ from the terms $\vec{E}_1$ and $\vec{E}_2$. That is, the three modes of $\omega_1$, $\omega_2$, $\omega_3$ are combined.

The relationship between the polarization $\vec{P}_{NL}$ and the electrostatic field $\vec{E}$ is expressed by the Maxwell equation. That is, $$\Delta \vec{E} - \frac{1}{(c/\eta)^2} \frac{\partial^2 \vec{E}}{\partial t^2} = \mu \frac{\partial^2 \vec{P}_{NL}}{\partial t^2} \qquad (9)$$

wherein $$\Delta = \frac{\partial^2}{\partial x^2} + \frac{\partial^2}{\partial y^2} + \frac{\partial^2}{\partial z^2}$$

and further, c is the velocity of beam in a vacuum, $\eta$ is the refractive index of the medium and $\mu$ is the magnetic permeability of the medium. In this case, the field vectors of the three beams are expressed by the following equation on the assumption that they progress in the z-direction.

$$\vec{E}_i = \vec{e}_i \rho_i \cos(\omega_i t - k_i z + \phi_i) \quad (i=1,2,3) \qquad (10)$$

wherein $\vec{e}_i$ is a unit vector and $\rho_i$ is a variable representing an amplitude. When the equations (7), (8) and (10) are substituted into the equation (9) and when it is assumed that $$d^2\rho_i/dz^2 << k_i \cdot d\rho_i/dz,$$

then the following equation will result.

$$\frac{d\rho_1}{dz} = -\frac{\omega_1^2 K}{k_1} \rho_2 \rho_3 \sin\theta \qquad (11)$$

$$\frac{d\rho_2}{dz} = -\frac{\omega_2^2 K}{k_2} \rho_3 \rho_1 \sin\theta$$

$$\frac{d\rho_3}{dz} = -\frac{\omega_3^2 K}{k_3} \rho_1 \rho_3 \sin\theta$$

$$\frac{d\Theta}{dz} =$$

-continued $$\Delta k + K \left( \frac{\omega_3^2}{k_3} \frac{\rho_1 \rho_2}{\rho_3} = \frac{\omega_2^2}{k_2} \frac{\rho_3 \rho_1}{\rho_2} - \frac{\omega_1^2}{k_1} \frac{\rho_2 \rho_3}{\rho_1} \right) \cos\theta$$

wherein $$K = \chi^{(2)} \mu_0/2, \Delta K = k_3 - k_1 - k_2,$$
$$\theta = \Delta kz - \theta_3 + \theta_2 + \theta_1$$

provided that $\chi^{(2)}$ which is an element of the matrix $\chi^{(2)}$ differs depending on how the plane of polarization for the incident beam is oriented. Further, $\mu_0$ is the magnetic permeability in a vacuum. By solving this differential equation, it is possible to obtain variations of the amplitudes $\rho_1$, $\rho_2$ and $\rho_3$ of the three frequency components.

Now let us consider the Second Harmonics Generation (SHG) as a particular case. This case corresponds to the equation (11) provided that $$\omega_1 = \omega_2 = \omega, \omega_3 = \omega_1 + \omega_2 = 2\omega, \text{ and } \rho\omega = \rho_1 = \rho_2, \rho_{2\omega} = \rho_3$$

and the following equation is derived therefrom.

$$\frac{d\rho_\omega}{dz} = -\frac{2\omega^2 K}{k_\omega} \rho_\omega \rho_{2\omega} \sin\theta \quad (12)$$

$$\frac{d\rho_{2\omega}}{dz} = \frac{4\omega^2 K}{k_{2\omega}} \rho_\omega^2 \sin\theta$$

$$\frac{d\theta}{dz} = \Delta k + 2\omega^2 K \left( \frac{2}{k_{2\omega}} \frac{\rho_\omega^2}{\rho_{2\omega}} - \frac{1}{k_\omega} \rho_{2\omega} \right) \cos$$

$$\Theta = \Delta kz - \theta_{2\omega} + 2\theta_\omega$$
$$\Delta k = k_{2\omega} - 2k_\omega$$

To obtain the variation of $\rho_{2\omega}$ by solving the above equation, the result shown in FIG. 7 will be obtained. In this case, $$\Delta S = \Delta k l_o$$

and $l_0$ designates the length required for about 75% of the fundamental wave output to be converted to a double high harmonic wave when $\Delta k=0$. From this result, it will be understood that when $\Delta k=0$, $\rho_{2\omega}$ in increases uniformly together with z but when $\Delta k\neq 0$, $\rho_{2\omega}$ vibrates and the wavelength conversion is not effectively performed. From a qualitative point of view, this means that when $\Delta k=0$, the second high harmonic wave is effectively amplified because the polarization wave and second high harmonic wave generating therefrom go side by side in the same phase but when $\Delta k\neq 0$, a phase mismatch takes place because the velocity of polarization wave differs from that of the second high harmonic wave.

Now, the conditions for satisfying $\Delta k=0$ will be described below.

$$k_\omega = \frac{2\pi}{\lambda_\omega} = \frac{\omega}{c/\eta_\omega} \quad (13)$$

$$k_{2\omega} = \frac{2\pi}{\lambda_{2\omega}} = \frac{2\omega}{c/\eta_{2\omega}} \quad (14)$$

wherein $\lambda_\omega$, $\lambda_{2\omega}$ and $\eta_\omega$, $\eta_{2\omega}$ are the lengths and refractive indices of the fundamental wave and second high harmonic waves, respectively. Therefore, to satisfy $\Delta k=0$, $\eta_\omega=\eta_{2\omega}$ must be satisfied. However, as will be understood from the fact that a white beam is separated by a prism, the refractive index differs depending on the wavelength and generally, the relationship of $\eta_{2\omega}>\eta_\omega$ is established That is, $\Delta k\neq 0$ is usual.

To solve this problem, various kinds of phase matching means have been proposed. The first of them is the use of a nonlinear optical crystal having an optical anisotropy. In such crystal, the incident beam is divided into normal and abnormal beams and the refractive index of the former is constant irrespective of the direction of incidence while that of the latter changes depending on the direction of incidence. However, there is a direction in which the refractive indices of both of the beams coincide with each other and this direction is called an optical axis. Further, where the crystal has a single optical axis, it is called a uniaxial crystal and where two, it is called a biaxial crystal. Here, we consider only the uniaxial crystal. Note that the two beams displace from each other due to double refraction except in the direction of the optical axis and a direction normal thereto. For example, where the angle of incidence is 0° (the angle between the surface of the crystal and the incident beam is 90° ), the normal beam Lo progresses linearly but the abnormal beam Le refracts as shown in FIG. 8. In summation, it is in the optical axis direction that the refractive indices of the normal and abnormal beams are equal and in the direction normal to the optical axis that the progressing directions of the normal and abnormal beams are equal.

FIG. 9 shows a relationship between the directions $\theta$ of a beam and $\eta$ wherein $\eta^o_\omega$ and $\eta^e_\omega$ are the refractive indices of fundamental wave normal and abnormal beams, and $\eta^o_{2\omega}$ and $\eta^e_{2\omega}$ are those of second high harmonic wave normal and abnormal beams, respectively. From this figure, it will be understood that at an angle of $\theta_m$ with respect to the optical axis (z axis) $\eta^o_\omega (\theta_m)$ and $\eta^e_{2\omega} (\theta_m)$ coincide with each other. That is, phase matching is satisfied between fundamental wave as normal beam and second high harmonic wave generated as abnormal beam when the fundamental wave as normal beam is applied at angle $\theta_m$. To make the fundamental wave a normal beam, it may be applied as a linear polarization in a direction normal to the z axis whereby a high harmonic wave is emitted as a linear polarization parallel to the z axis. A case in which the fundamental wave is a normal beam and the high harmonic wave is an abnormal beam is generally called a Type I phase matching, as described above. On the other hand, it is possible for the fundamental wave to be a combination of a normal beam and an abnormal beam and such case is called a Type II phase matching. For the sake of simplicity of explanation, we will consider only the Type I phase matching.

The above described angle phase matching (i.e., the Type I) is convenient because it is performed by mere adjustment of the incidence angle. However, as shown in FIG. 8, since the fundamental wave and the second high harmonic wave progress in different directions, the region of interaction of both the waves is limited to the hatched portion in the figure However, if $\theta_m$ could be 90°, the progressing directions of both normal Lo and abnormal Le beams will coincide so that a high efficiency wavelength conversion can be made but it is general that $\eta^o_\omega \neq \eta^e_{2\omega}$ (90° ). However, there is a case in which both of the directions coincide when the temperature of the crystal is changed. This is because the temperature dependability differs between the refractive indices $\eta^o_\omega$ and $\eta^e_{2\omega}$. For example, when the output of the YAG laser (of wavelength of 1.06 μm) is a fundamental wave, it is possible to obtain a phase matching of 90° by controlling the temperature to 165° C. for lithium niobate ($LiNbO_3$) and 181° C. for potassium niobate ($KNbO_3$). Of course such temperatures differ depending on the wavelength of the laser output so that for example, it is possible to obtain the 90° phase matching at 25° C. with respect to a wavelength of 0.86 μm by using $KNbO_3$.

As other approaches for performing phase matching, there is one that uses a wave guide and one that applies fundamental waves from different directions. The former is represented by an optical fiber and a thin film wave guide and makes use of the phenomenon that the effective refractive index changes when the diameter or thickness of the wave guide is changed. That is, the mode of the beam propagating through the wave guide is dispersive and the dependability of the refractive indices of the beam with respect to the width of the wave guide differs. Therefore, phase matching is performed by allotting the fundamental and high harmonic waves to different modes and by adjusting the thickness of the wave guide. On the other hand, the latter approach takes into account phase matching based on a vector volume. Heretofore, it has been considered that the fundamental and high harmonic waves progress in the same direction. However, as shown in FIG. 10, when two fundamental waves are applied from different directions with an angle α therebetween with wave number vectors $\vec{k}_\omega^1$ and $\vec{k}_\omega^2$, the induced nonlinear polarization wave propagates with a wave number vector of $\vec{k}_\omega^1 + \vec{k}_\omega^2$. The condition for phase matching between the nonlinear polarization wave and the resultant second high harmonic wave of a wave number vector $\vec{k}_{2\omega}$ which propagates in the same direction as the former is expressed by the following equation when $|\vec{k}_\omega^1| = |\vec{k}_\omega^2|$:

$$\eta_\omega \cos \alpha = \eta_{2\omega} \quad (15)$$

Accordingly, in the case of a bulk crystal, phase matching is performed by adjusting α when the fundamental waves are normal beams and the second high harmonic wave is an abnormal beam. Further, it is also possible to perform a phase matching by using a wave guide such that the fundamental and high harmonic waves are allotted to different modes and α is adjusted instead of the width of the wave guide.

Of the above-mentioned conventional phase matching approaches, the one in which the incidence angle to the nonlinear optical crystal is adjusted is convenient but it has been accompanied with the problem that the interaction of the fundamental wave and high harmonic wave cannot be maintained long due to double refraction. On the other hand, the approach in which the temperature of the crystal is adjusted by applying the beam in the direction normal to the optical axis makes it possible to perform a high efficiency wavelength conversion, since the directions of the fundamental wave and high harmonic wave coincide with each other, but since the range in which the refractive index varies by changing the crystal temperature is quite small, the refractive index value must originally be suitable for the range so that the means is applicable to only a few kinds of crystals. Further, the wavelength range for effecting 90° phase matching is naturally limited.

Likewise, the approach of adjusting the width of the wave guide is hopeful but it still has many difficulties in actual practice because the wave guide width must be controlled to a high degree of accuracy.

Further, the approach of applying two fundamental waves from two different directions has had the problem that when the fundamental waves are so converged as to increase their energy density, the region where they overlap becomes small resulting in decreasing the efficiency.

An object of the present invention is to eliminate the above-mentioned problems and to provide a high efficiency wavelength conversion device which is applicable to a variety of nonlinear optical materials and to beams in a wide range of wavelengths.

Accordingly, it is an object of the present invention to eliminate the above-mentioned problems in the prior art and to provide a laser beam wavelength converting apparatus which facilitates phase matching and which is capable of enhancing the wavelength conversion efficiency.

It is another object of the present invention to provide a wavelength converting apparatus which has few restrictions in the kind of the nonlinear optical crystal and the wavelength range.

It is still another object of the present invention to provide a high-precision wavelength converting apparatus which facilitates phase matching without the need for temperature control or other special control arrangements.

It is a further object of the present invention to provide a wavelength converting apparatus for an SHG or OPO system having the above-described characteristics and advantages.

SUMMARY OF THE INVENTION

In order to achieve the above objectives, the wavelength conversion device according to the present invention is an improvement over prior art devices of the type provided with beam generating and projecting means and a nonlinear optical medium and operating such that a beam from the beam generating and projecting means is applied on the nonlinear optical medium so that an outgoing beam having a wavelength different from that of the incident beam is derived from the nonlinear optical medium. In one embodiment the improvement in accordance with the invention is achieved by providing wave front conversion means between the beam generating and projecting means and the nonlinear optical medium such that the wave front of the beam from the beam generating and projecting means is made substantially conical and converged as applied to the nonlinear optical medium and further, the beam generating and projecting means is so constructed that the beam therefrom is applied to the wave front conversion means in a collimated form. In this case, the wave front conversion means may be a conical lens having the top of the conical portion directed opposite to the beam generating and projecting means.

In another embodiment, the nonlinear optical medium may be formed such that the surface facing the beam generating and projecting means is made substantially conical so that the wave front of the beam from the beam generating and projecting means is converted to become conical and converged into the nonlinear optical medium and the beam generating and projecting means is so constructed that the beam therefrom is applied on the nonlinear optical medium in collimated form.

In still another embodiment, the nonlinear optical medium may be formed so that the surface thereof facing opposite the beam generating and projecting means is made substantially conical in configuration with the top of conical portion extending outward, so that the wave front of the beam from the beam generating and projecting means is reflected to become conical and converged into the nonlinear optical medium. The beam generating and projecting means may be so constructed that the beam therefrom is applied on the nonlinear optical medium in collimated form and a plane parallel plate may be interposed between the beam generating and projecting means and the nonlinear optical medium so that of the beam components reflected on the plane parallel plate, the high harmonic wave is directed normal to the beam from the beam generating and projecting means.

In addition, in a further embodiment, a substantially conical mirror may be provided at a position opposite the beam generating and projecting means with the conical concave top portion directed opposite to the means so that the beam from the beam generating and projecting means is reflected thereon with its front face becoming conical and converged into the nonlinear optical medium. The beam generating and projecting means may be constructed as described above and the plane parallel plate is interposed between the beam generating and projecting means in the manner as already described.

In any of the above-mentioned embodiments, it is generally preferable that the nonlinear optical medium, conical lens and conical mirror be enclosed within a temperature adjusting vessel.

In alternative embodiments of the invention, beam convergence is preceded by divergence of a beam. These embodiments may include wave surface conversion means for converting a laser light flux projected from a laser beam generating means into a divergent laser light flux having an annular wave surface and converging means for converging the converted laser light flux, which is provided at an adjustable distance from the wave surface conversion means. These embodiments also include a nonlinear optical medium for receiving the converted laser light flux such that the laser beam light flux is converged therewithin, whereby the laser beam which is received by the nonlinear optical medium, with its wavelength converted under a nonlinear matching condition, is extracted from the nonlinear optical medium.

A wave surface conversion means for converting a laser light flux projected from a laser beam generating means into a divergent laser light flux having an annular wave surface may include a convex conical mirror. Generally, however, the wave surface conversion means may include a concave conical lens and a converging means in the form of a convex condenser lens. In this case, it is preferable that the light receiving surface of the condenser lens is a convex conical surface such that the light flux in the lens is collimated, and the light emitting surface is a concave converging surface.

In the case of applying the present invention to wavelength conversion of an SHG system, the wavelength converting apparatus may generally be disposed outside of the resonator system of a laser beam generating means, but the wavelength apparatus may be incorporated into the resonator system, if appropriate. In the case of applying the present invention to wavelength conversion of an OPO system, the wavelength converting apparatus is preferably disposed within the resonator system.

BRIEF DESCRIPTION OF THE DRAWINGS

FIG. 2 is a block diagram of a second embodiment which utilizes a shaped crystal;

FIG. 3 is a block diagram of a third embodiment which utilizes an output mirror with an exit port;

FIG. 4 is a block diagram of a fourth embodiment which utilizes an external resonator;

FIG. 5 is a block diagram of a fifth embodiment which utilizes a crystal shaped on the exit end;

FIG. 6 is a block diagram of a sixth embodiment which utilizes a conical mirror;

FIG. 7 is a graph showing an increase of a second high harmonic wave by SHG (Second High Harmonic Generation);

FIG. 8 is a simulative view showing separation of a normal beam from an abnormal beam due to refraction;

FIG. 9 is an illustrative view showing a principle of phase matching in the presence of refraction;

FIG. 10 is an illustrative view showing a relationship between a wave number vector of a fundamental beam becoming incident in a different direction and a wave number vector of a generating nonlinear polarization wave;

FIG. 19 shows a second embodiment of a device utilizing divergence, wherein the input surface of a divergence element is shaped;

FIG. 20 shows a third embodiment of a device utilizing divergence, wherein beam divergence is achieved by crossover within a focused beam; and FIG. 21 shows a fourth embodiment of a device utilizing divergence in application to an OPO system of the general type shown in FIG. 4.

DESCRIPTION OF THE INVENTION

The present invention was preceded by a detailed analysis of how a beam passing through a conical lens is converged. To begin with, a case in which fundamental waves become incident upon the conical lens from two directions will be described with reference to FIG. 11, which shows a state in which beams $L_1$ and $L_2$ each having a wavelength $\lambda_\omega$ are applied through the optical medium at an angle of $\alpha$ with respect to the direction Q without passing through a conical lens. The lines skewed to the direction Q represent the wave fronts of these beams. As will be clear from FIG. 11, for the wavelength $\lambda_Q$ when, in the above state, the electric field formed at the crossing point of the means is viewed is:

$$\lambda_Q = \lambda_\omega / \cos \alpha \tag{16}$$

That is, phase matching between the high harmonic wave and fundamental wave in the direction Q becomes possible since $\lambda_Q$ can be controlled by changing the angle $\alpha$. However, if fundamental waves are converged for performing a wavelength conversion efficiently, the length of interaction of the two beams would become short.

Figure 11:
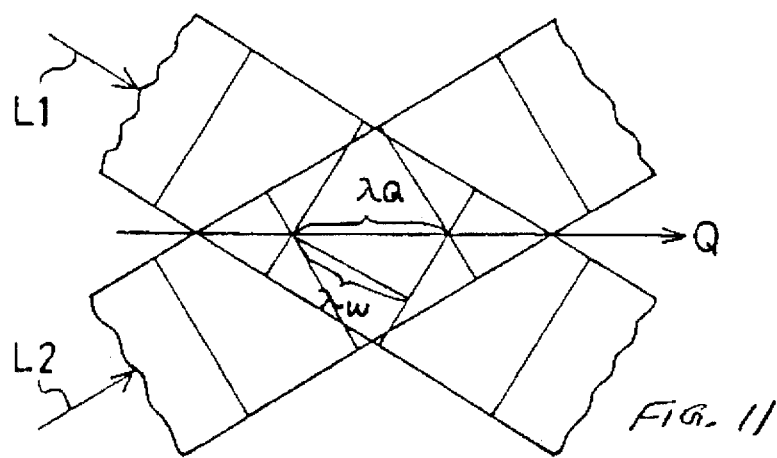
FIG. 11 is a simulative view showing the wave fronts of two beams at their crossing point when the beams become incident upon a medium from two directions without passing through a conical lens.
Figure 12A:
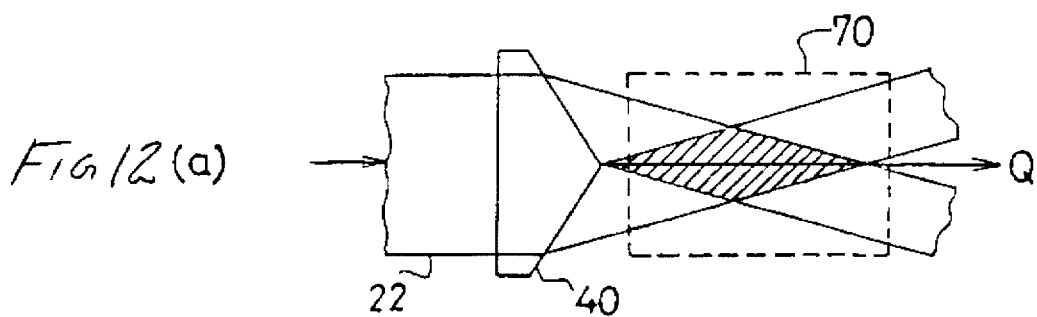
FIG. 12($a$) is a simulative view showing the converging function of the conical lens and FIG. 12($b$) is a similar view including diverging and converging functions.
Figure 12B:
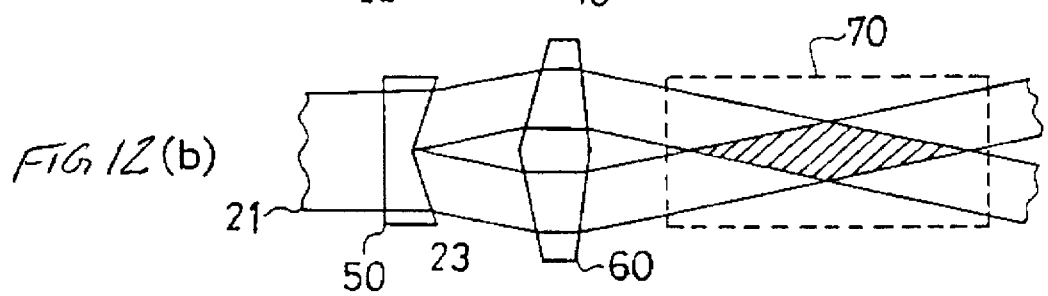

In view of this, the present inventors investigated the effects of beam convergence by a conical lens. FIG. 12(a) shows an example in which a conical lens is used. In FIG. 12(b), a parallel laser light flux 21 is projected as the fundamentals waves onto a concave conical lens as a wave surface conversion means 50 so as to first convert it into a divergent light flux 23, and thereafter a hatched portion which is analogous to the intersecting portions of the two beams shown in FIG. 11 is formed in the optical medium 70 by a convex condenser lens as a converging lens 60. Comparing FIG. 12 to FIG. 11 it may appear that both figures are similar to each other. However, the apparent similarity is only because the figures are drawn two-dimensionally; actually they are fundamentally different from each other.

Figure 13:
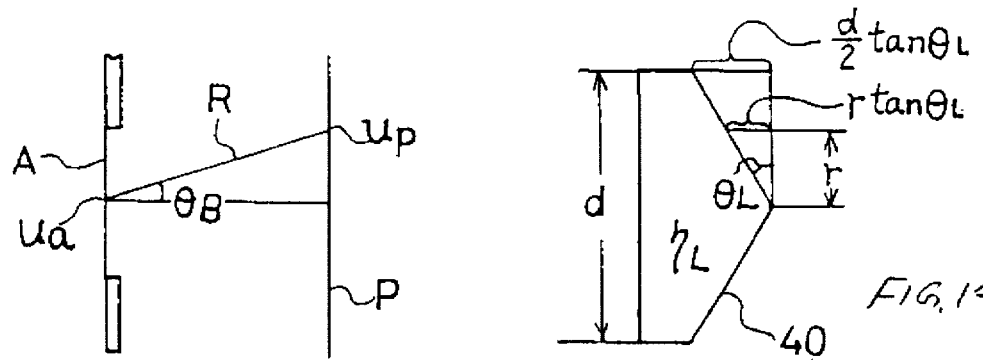
FIG. 13 is a view illustrating a beam propagating through an opening.
Figure 14:
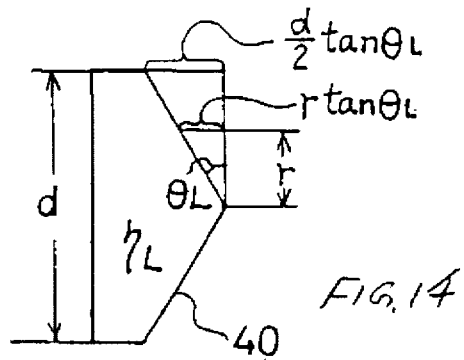
FIG. 14 is an illustration of parameters relating to a conical lens.

In order to observe how a beam propagates after it has passed through an opening A as shown in FIG. 13, the following Kirchhoff's equation may be used.

$$u_p = \frac{ik}{4\pi} \iint A\, u_a \frac{e^{-ikR}}{R} (1 + \cos\theta_B) ds \quad (17)$$

wherein $u_a$ is the amplitude distribution of an electrostatic field at the opening A, $u_p$ is the amplitude distribution of the electrostatic field when the beam propagated from the opening A has reached another plane P, R is the length of a vector connecting a point of the opening A and a point in the plane P, $\theta_B$ is the angle the vector makes with a line normal to the opening A, and ds is an area element of the opening A. In order to discuss the converging process by the conical lens, it may be well to consider that a phase lag takes place at a point at which the plane wave has reached the opening. Now, assuming that the phase lag is expressed by $$P_d = e^{-j\psi(r)} \quad (18)$$

the following equation will result as will be clear from FIG. 14.

$$\begin{aligned}\psi(r) &= k\eta_L\left(\frac{d}{2}\tan\theta_L - r\tan\theta_L\right) + kr\tan\theta_L \\ &= k\tan\theta_L\left(\eta_L\left(\frac{d}{2} - r\right) - r\right)\end{aligned} \quad (19)$$

wherein k is the constant for waves in the air, $\theta_L$ is the angle between the conical and bottom surfaces of the lens (the "vertical angle" of the lens), $\eta_L$ is the refractive index of the lens, d is the diameter of the lens and r is the distance from the center of the lens. Assuming that the absolute value of the field strength at the opening A is 1, $$u_a = e^{j\psi(r)} \quad (20)$$

will follow and so the beam distribution will be able to be obtained by numerical integration with the substitution of the above equation into the equation (17). As $u_p$ is a complex amplitude representing the field strength, the energy density I is obtained by the equation of:

$$I = |u_p|^2 \quad (21)$$

Figure 15:
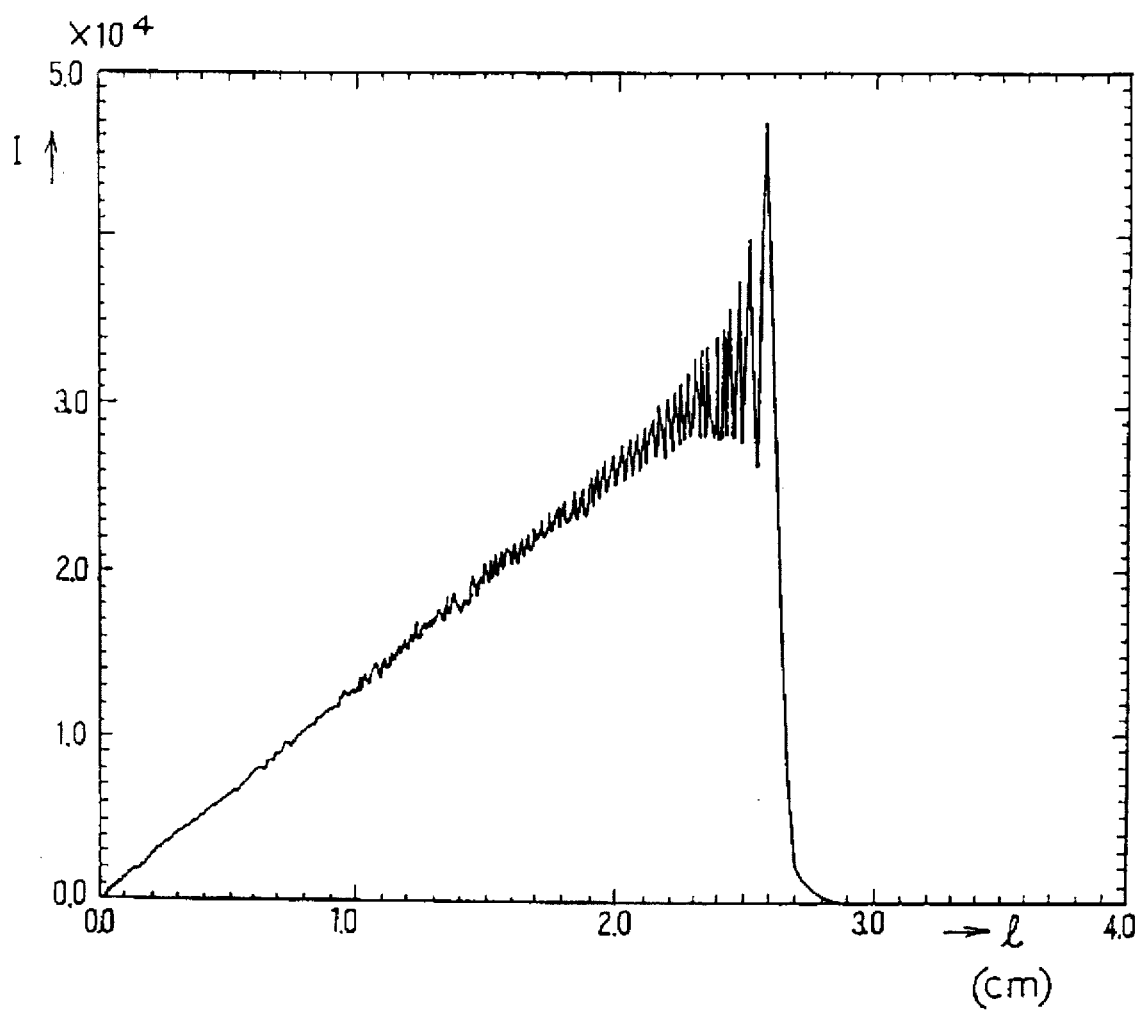
FIG. 15 is a graph showing a relationship between a position on the central axis of a beam converged by a conical lens and the energy density of the beam.

FIG. 15 is a graph showing the energy density value on the center line of the beam after the passage of the beam through the lens, that is, on the Q axis in FIG. 12. In the graph, $\theta_L=20°$, $d=1$ cm, $\eta_L=1.507$ and $k=5.91\times10^4$ cm$^{-1}$ (equivalent to $\lambda=1.063$ μm). As will be clear from the figure, the value of energy density I increases in proportion to the distance l on the Q axis but it abruptly decreases at a distance of about 2.6 cm, that is, the point at which the overlapped beams begin to separate again. From the above calculation, it will be seen that the energy density on the center line of the beam becomes about $4\times10^4$ times the incident beam. The oscillations overlaid on the increase curve are due to diffractions at the end portion of the opening A.

Figure 16:
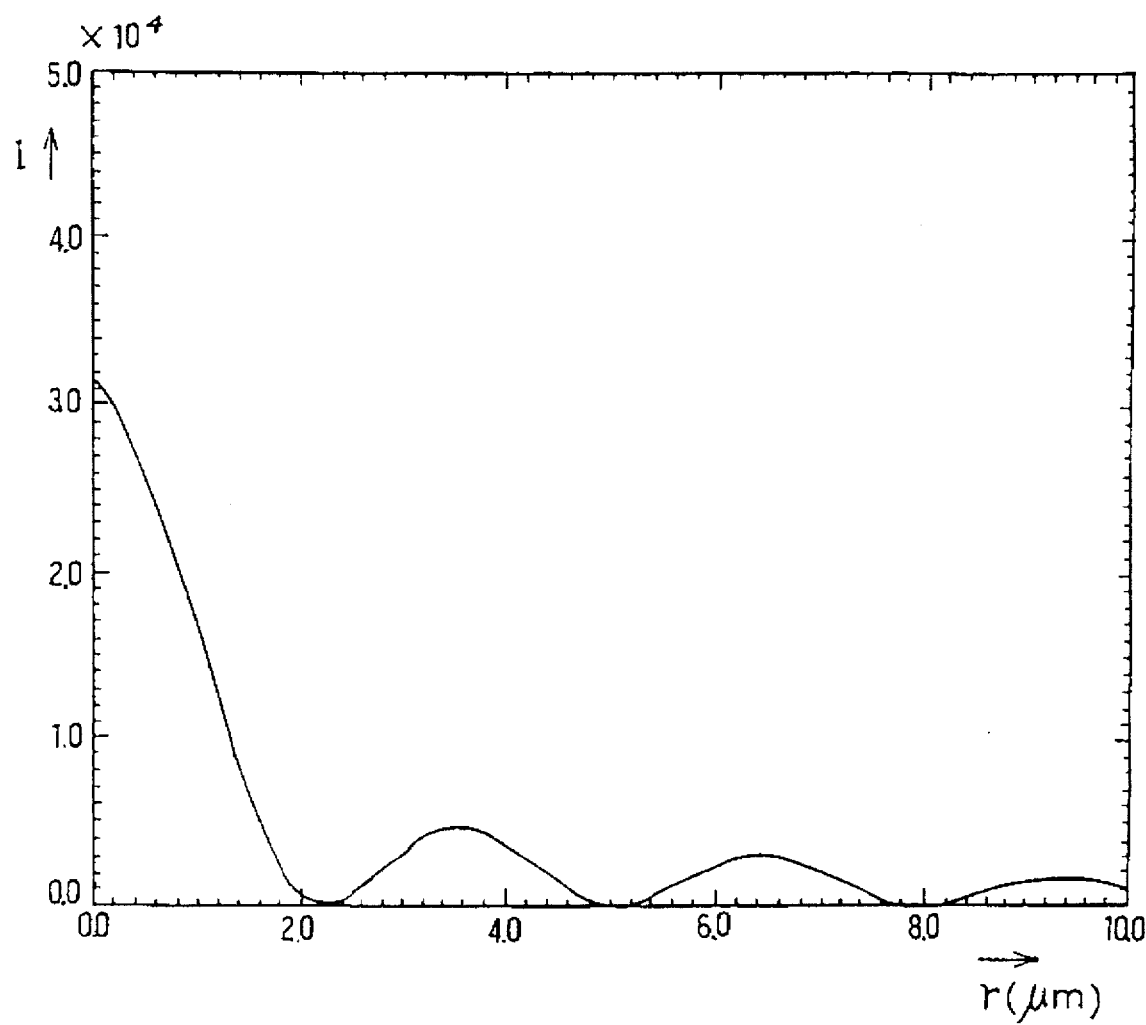
FIG. 16 is a graph showing beam energy density variations in a directional normal to the central axis of a beam.

FIG. 16 is a graph showing the results of obtaining the energy density in the direction normal to the Q axis at the point of $l=2.5$ cm in FIG. 15. From this graph it will be seen that the energy density has a large peak value in the region of a radius of about 2 μm near the center.

Figure 17:
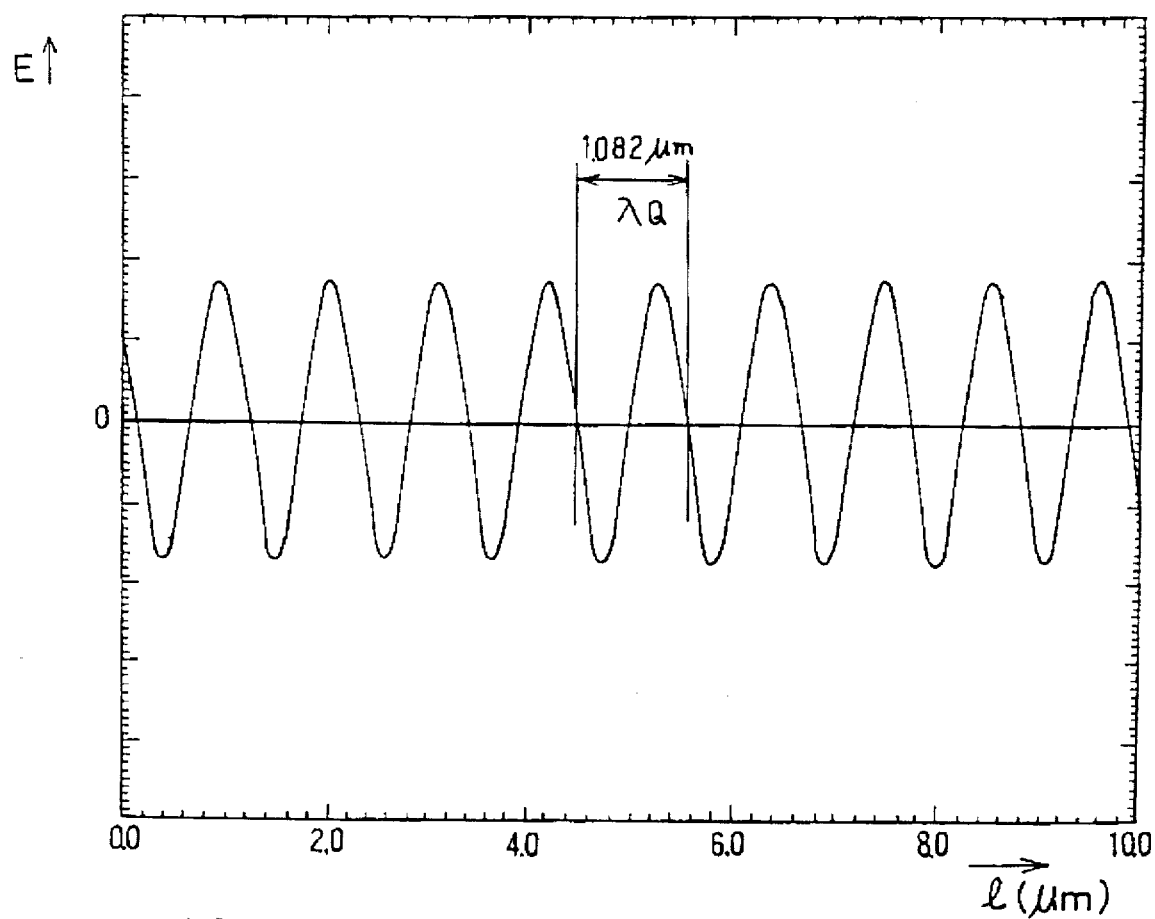
FIG. 17 is a graph showing the field strength on the central axis of a beam.

To know the field strength instead of the energy density, it may be well to obtain the real number portion of $u_p$. In FIG. 17, the electric field of the section (10 μm) of $l=2.499$–$2.5$ cm on the Q axis is shown on an enlarged scale and from this figure, it will be seen that the wavelength $\lambda_o=1.082$ μm. On the other hand, where the abovementioned lens is used, the angle α the beam after refraction makes with the z axis is $11.026°$ and hence $\lambda_o=1.083$ μm from the equation (16) so that it will be seen that the wavelength of the vibrating electric field on the Q axis is substantially equal to the estimated value according to the equation (16).

In summation, when the beam is converged by the conical lens, the optical energy is focused on the center line of the beam with the formation of sharp peaks of energy density and the wavelength of the vibrating electric field can be adjusted by changing the vertical angle of the conical lens.

The present invention makes use of the abovementioned characteristics of the conical lens. According to the invention, the kind of nonlinear optical crystal and the wavelength $\lambda_o$ for 90° phase matching are first determined on the basis of the wavelengths of the fundamental and high harmonic waves and then the vertical angle of the conical lens is determined. When a laser beam is converged by this type of lens to become incident upon the crystal, the desired phase matching conditions are almost satisfied. Next, a fine adjustment of phase matching is possible by changing the temperature of the crystal. This temperature can be set near the room temperature and it is possible to meet various wavelengths by changing the vertical angle of the lens. Further, as the optical energy concentrates on the central axis of the beam and the ridges formed by the peaks of the optical energy continue long, the length of interaction of polarization and high harmonic waves becomes long thereby enabling a high efficiency wavelength conversion to be performed.

PREFERRED EMBODIMENTS UTILIZING CONVERGENCE

Preferred embodiments of the wavelength conversion device of the present invention utilizing convergence techniques will now be described in detail. Alternative embodiments utilizing a combination of divergence and convergence will be described in greater detail under a separate heading below.

Figure 1:
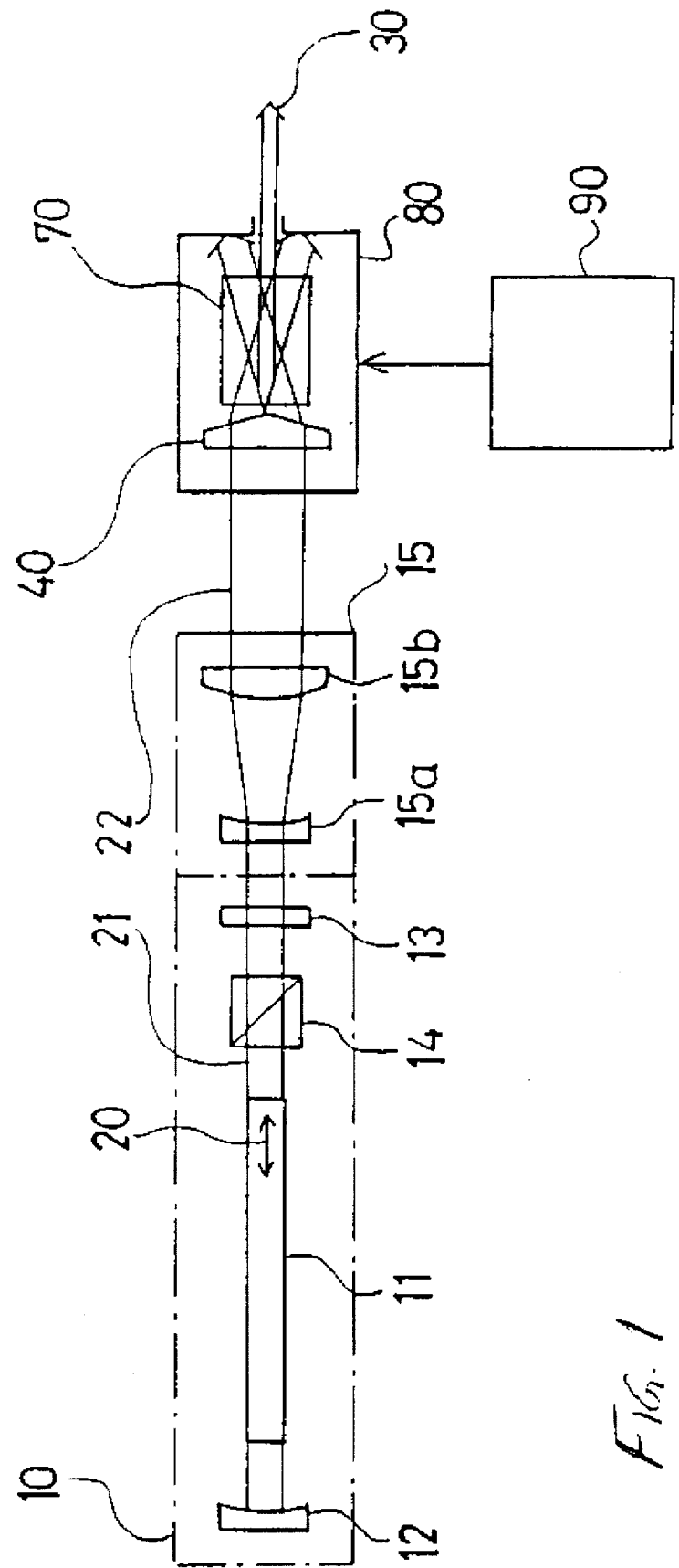
FIG. 1 is a block diagram of a first embodiment of a wavelength conversion device according to the present invention, which utilizes a conical lens.

FIG. 1 shows a structure of a first embodiment of the invention. As shown, a first beam generating and projecting means, for providing an optical frequency electro-magnetic beam, comprises a YAG rod 11, a total reflection mirror 12, an output mirror 13 for allowing a part of a laser beam to pass therethrough, a polarizer 14 and a beam expander 15 to be described later. A laser resonator is formed by the elements 11 through 14 and a laser beam of a wavelength of 1.063 μm is output from the output mirror 13. Note that in FIG. 1, a lamp and a power source for exciting the YAG are omitted since they have no direct relation with the present invention. As the polarizer 14 is within the laser resonator, the output beam becomes a linearly polarized one. For performing the Type I wavelength conversion, the direction of polarization becomes normal to the optical axis of the nonlinear optical crystal. After being expanded in diameter or cross-section by the beam expander 15 formed of a lens pair including a concave lens and a convex lens, the laser beam is applied as a collimated beam to a conical lens 40 so as to be converged thereby and becomes incident upon a lithium niobate (LiNbO$_3$) crystal 70 as a nonlinear optical medium, from an entrance side, or receiving, surface at the left end of the crystal, as shown. In this connection, the beam expander 15 is not required when the diameter of the laser beam is originally large. In this case, a fundamental wave is released radially, at an angle off the axis, from an exit side, or emitting, surface of the crystal 70 while a high harmonic wave 30 generates on the central axis of the beam. The conical lens 40 and the LiNbO$_3$ crystal 70 are contained within a temperature adjusting vessel or enclosure 80 and the temperature of the crystal is controlled by a temperature controller 90. Note that FIGS. 1 through 6 show simplified cross-sectional type views, so that, for example, mirror 12 may typically be a concave mirror of circular configuration when viewed along the central axis of the device.

FIG. 2 shows a structure of a second embodiment of the present invention. Note that in FIGS. 2 through 6, parts in common with FIG. 1 are designated by like reference numerals for the sake of omitting repetitive description thereof. The point of difference between the instant embodiment and the first embodiment resides in that in the case of the FIG. 2 embodiment, the entrance side surface of the LiNbO$_3$ crystal 71 is ground to a substantially conical shape instead of using a conical lens, so as to make use of beam refraction on the surface but both of the embodiments are based on the same principle.

On the other hand, a third embodiment of the present invention shown in FIG. 3 differs greatly from the above two embodiments in that the former performs wavelength conversion within the laser resonator. In the instant embodiment, the exit side surface of the crystal 70 faces toward an output mirror 16 having a substantially conical reflecting surface whose angle of inclination is adjusted to the angle of refraction of the beam due to the use of the conical lens. Further, the output mirror 16 is provided with a central exit port for taking out a high harmonic wave. The reflectance of the reflecting surface with respect to the fundamental beam (wavelength=1.063 μm) is set to 100%. That is, the fundamental wave is confined within the resonator without releasing outside. Further, the entrance side surface of a LiNbO$_3$ crystal 70 is applied with a HR (high reflection) coating against the high harmonic wave (wavelength=0.532 μm) so that substantially the full high harmonic wave 30 generated is released from the exit port. This structure is quite effective in enhancing the wavelength conversion efficiency because the strength of the fundamental wave is large in the resonator and a secondary nonlinear polarization is proportional to the square of the strength of the fundamental wave.

The above three embodiments are examples of applications of the present invention to second high harmonic generation (SHG), but the embodiment to be described next is an application of the present invention to optical parametric oscillations (OPO). As to a case in which beams of angular frequencies $\omega_1$, $\omega_2$, $\omega_3$ interact due to the secondary nonlinear polarization to satisfy the relationship of $\omega_3=\omega_1+\omega_2$, we have already described that with reference to the equations (7) through (11) and the OPO also makes use of such relationship. In this case, a beam of $\omega_3$ is applied as a fundamental wave to generate beams of $\omega_1$ and $\omega_2$. The values for $\omega_1$ and $\omega_2$ are determined by the following phase matching condition:

$$\Delta \vec{k} = \vec{k}_3 - \vec{k}_1 - \vec{k}_2 = 0 \tag{22}$$

The difference between the OPO and SHG in performing phase matching resides in the fact that in the case of the former, the wavelength of the fundamental wave is smaller than that of the beam generated from the fundamental wave. Accordingly, in the normal condition, the wavelength of the nonlinear polarization wave is smaller than that of the generating beam. As will be clear from the examples of SHG, it is possible with the present invention to adjust the wavelength of the nonlinear polarization wave to increase. That is, when the present invention is applied to the OPO, it is possible to obtain a phase matching without making use of double refraction.

In the case of the OPO, the crystal is put into the resonator and the beam generated from the crystal is amplified in the resonator. Accordingly, the embodiment shown in FIG. 4 includes similar components. In FIG. 4, an entrance side surface 70a of the crystal is applied with an AR (antireflective) coating against the fundamental wave and with a HR coating. Further, an external resonator output mirror 18 beyond the exit side surface 70b allows a part 31 of the generated beam to pass therethrough. That is, the generated beam resonates and a part thereof is taken out from the mirror 18.

All of the above embodiments make use of a conical refractive surface but the same effect can be obtained by using a conical concave reflecting surface.

A fifth embodiment of the present invention is shown in FIG. 5. In FIG. 5, and FIG. 6 to be described later, only the portion of the device located away from the beam expander 15 in the laser beam progressing direction is shown and the vessel 80 and the temperature controller 90 are omitted. In FIG. 5, a LiNbO$_3$ crystal 72 has its one surface ground substantially conical as in the case of the second embodiment so as to form a reflecting surface 42. This surface 42 is applied with a HR coating against the fundamental wave. In the above arrangement, when a laser beam as a fundamental beam is applied to the plane entrance side surface of the crystal 72, the fundamental beam reflects on the conical reflecting side surface 42, a high harmonic wave generates on the center axis of the converged beam, as in the cases of the previous embodiments, and becomes incident upon a plane parallel-sided plate 17. In the instant embodiment, both surfaces of the plane parallel plate 17 are applied with an AR coating against the fundamental beam and with a HR coating against the high harmonic wave, respectively, so that the high harmonic wave is outputted in a direction normal to the fundamental wave, as shown by the vertical arrow 30.

FIG. 6 shows a sixth embodiment of the present invention. This embodiment uses a conical mirror 43, instead of grinding a LiNbO$_3$ crystal 70 conical, and is based on the same principle as the fifth embodiment. However, as will be clear from the figure, it can not converge every fundamental wave within the crystal 70 because a clearance spacing inevitably exists between the mirror 43 and the crystal 70 so that it is somewhat less effective as compared with the FIG. 5 embodiment, however, the machining of the crystal is simpler since it need not be ground to conical shape.

As described in detail, when the present invention is applied to the second high harmonic generation, a 90° phase matching is obtained with the use of various nonlinear optical crystals and a high efficiency wavelength conversion is made possible.

Further, where the invention is applied to the optical parametric oscillations (OPO), phase matching is made possible without using double refraction. Where double refraction is used, if it is desired to make the fundamental wave a normal beam and the generated wave an abnormal beam, it will be necessary to generate polarization in a direction normal to the polarizing direction of the fundamental beam. As will be seen from the equation (2), this means that the $d_{11}$ component of the secondary nonlinear polarizability matrix can not be used. However, the $d_{11}$ component is known to be larger than the remaining components. For example, MNA (2-methyl-4-nitroaniline) which has attracted a good deal of public attention of late as having a large nonlinear optical constant has the value of $d_{11}$ of 8.6 times that of $d_{12}$. Accordingly, since the OPO is made possible by the present invention without using double refraction, it is possible to achieve a high efficiency wavelength conversion using the $d_{11}$ component. Further, crystals such as tellurium Te and gallium arsenic GaAs which have not been used so far because of no double refraction despite their having a large non-linear optical constant can also be made use of with the present invention.

PREFERRED EMBODIMENTS UTILIZING DIVERGENCE

Figures 18A, 18B:
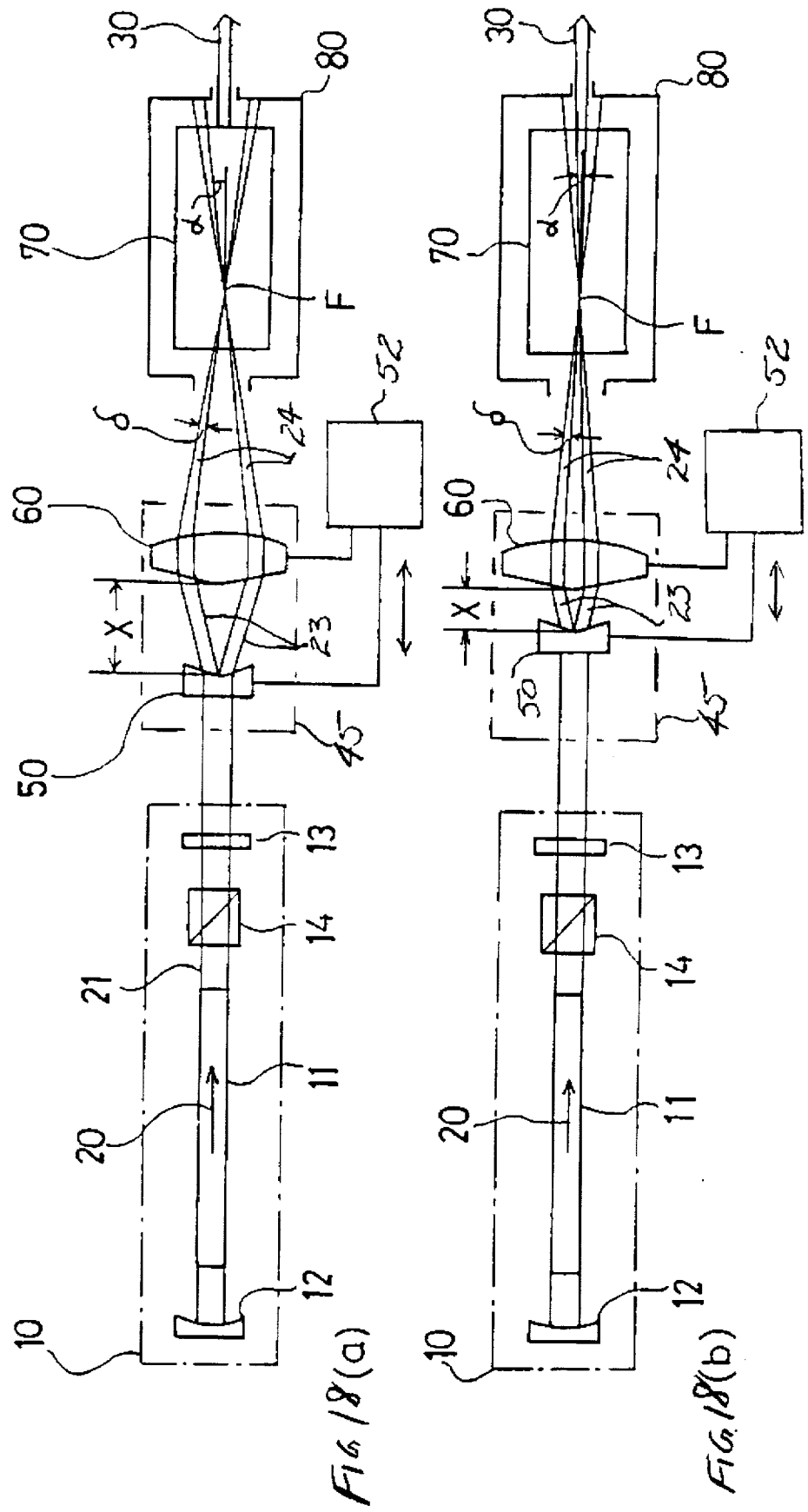
FIG. 18($a$) and FIG. 18($b$) show an alternative embodiment of a wavelength conversion device according to the invention which utilizes a combination of a wave front divergence means and a wave front convergence means and, more particularly, FIG. 18($b$) illustrates effects of a closer spacing of the diverging and converging elements than in FIG. 18($a$)

FIG. 18 shows an embodiment of the present invention which uses a wave front conversion means 45 which provides a combination of wave surface divergence followed by convergence. As shown, a wave front divergence means and a wave front convergence means are combined with each other in such a manner as to allow the gap or spacing therebetween, shown as the spacing "X", to be adjustable. FIG. 18(a) shows the state of having a large gap, while FIG. 18(b) shows the state of having a small gap. In this embodiment, a concave conical lens is used as a wave front divergence means 50 and the light receiving surface thereof has a flat surface. The narrow laser light beam 21 generated by the laser beam generating means 10 is received by the light receiving surface without passing through the beam expander unlike the first to fifth embodiments. The concave conical light emitting surface of the wave front divergence means 50 converts the laser light beam 21 into a laser light beam 23 which annularly diverges, as shown in FIG. 18. The convergence means 60 for receiving the annularly divergent laser light beam 23 has a convex conical surface having the same angle as the conical surface of the divergence means 50 as the light receiving surface, so that the laser light beam becomes an annular parallel light beam in the converging means 60 and is converged by the light emitting surface or the converging surface, which is spherical in this embodiment, into the focal point F on the converging surface in the nonlinear optical medium 70 as a circular laser light beam 24 in FIG. 18. The light emitting surface of the converging means 60 is not restricted to a spherical surface and may be a convex conical surface, as shown in 12(b).

According to this embodiment, it is easy to establish phase matching between a fundamental wave and a high harmonic wave by adjusting the gap x between the wave front divergence means 50 and the convergence means 60 and finely adjusting the angle g between the laser beam converged in the nonlinear optical medium 70 as a fundamental wave and the center line. More specifically, if the gap x is large, as shown in FIG. 18(a), the diameter of the ring of the laser light flux 23 which enters the converging means beam 60 is large and the angle α also becomes large. On the other hand, if the gap x is small, as shown in FIG. 18(b), the diameter of the ring of the laser light flux 23 and, hence, the angle α become small. Gap adjustment means 52, shown as being mechanically coupled to lenses 50 and 60, included in wave front conversion means 45, may be any device or arrangement suitable for adjusting the gap between the two lenses, as by changing the position of lens 50 as indicated.

In this way, the embodiment shown in FIG. 18 has an advantage beyond the benefits of the embodiments shown in FIGS. 1 to 5. That is, it is easy to adjust the angle α of projection of a fundamental wave onto a nonlinear optical medium in FIG. 18, while the angle is fixed in the first to fifth embodiments.

Even if the angle α is fixed, it is naturally possible to satisfy the phase matching conditions by accurately forming the angle of, for example, the conical surface of a wave front divergence means so as to coincide with a predetermined value and it is also possible to adjust the phase matching condition finely by controlling the temperature of the nonlinear optical medium. However, the optical characteristic of the nonlinear optical medium is so unpredictable depending upon the crystal producing conditions that it is difficult to estimate the angle of the conical surface. In some kinds of crystals, the temperature dependency of the refractive indexes of an ordinary ray and an extraordinary ray are substantially the same, so that it is difficult to produce accurate phase matching.

In such case, the wavelength converting apparatus shown in FIG. 18, in which the wave front divergence means and the wave front convergence means are combined with each other in conversion means 45 in such a manner as to allow the gap therebetween to be adjustable, is effective because the phase matching conditions are constantly secured with reliability and the temperature control of the nonlinear optical medium is dispensed with.

In the embodiment shown in FIG. 18, since the laser light beam 24 is converged into the focal point F in the nonlinear optical medium 70, if the annular space δ is too large, the angle α of laser beam projection varies. The angle distribution is disadvantageous in phase matching, and to eliminate this inconvenience, it is necessary to reduce the diameter of the laser light flux 21 sufficiently.

In the embodiment shown in FIG. 19, this limitation is removed. This embodiment adopts a conical lens having substantially the same configuration as that shown in FIG. 5 but a slightly concave curved light receiving surface at the input side of wave front divergence means 51. The annular laser light beam 23 projected from the wave front divergence means 51 has a stronger divergent property than that shown in FIG. 5, and deviates from a parallel light beam in such a manner as to slightly widen or spread toward the receiving surface of the converging means 60. The laser light beam 24 projected on the nonlinear optical medium 70 has a uniform angle α of projection which is equivalent to the light beam shown in the first embodiment shown in FIG. 1. This embodiment is also capable of maintaining the uniformity of the angle α of projection, even if the gap between the wave surface conversion means 51 and the converging means 60 is changed, by equalizing the conical angles of the light emitting surface of the divergence means 51 and the light receiving surface of the convergence means 60. Divergence means 51 and convergence means 60 in FIG. 19 comprise wave front conversion means (shown as dashed box 45 in FIG. 18) for adjustably converging the beam into the crystal 70.

The embodiment shown in FIG. 20 has the same basic operation as the embodiment shown in FIG. 19. In the FIG. 20 embodiment, a wave front divergence means 52 has a concave receiving surface in the same way as in the embodiment shown in FIG. 19, but the light emitting surface is formed into a convex conical surface. The light beam 24 projected from the converging means 60 is the same as that in the embodiment shown in FIG. 6 except that the laser light beam 23 output from the wave surface conversion means 52 is first converged and then diverged, as shown. In this embodiment, it is also preferable to equalize the conical angles of the light emitting surface of the wavefront divergence means 51 and the light receiving surface of the wavefront convergence means 60, which are included as components of the wavefront conversion means.

The above-described embodiments are suitable for wavelength conversion of an SHG system. Embodiments suitable for wavelength conversion of an OPO system will be explained hereinunder with reference to FIGS. 4 and 21. The principle of the OPO system is to project a beam having a frequency of $\omega_3$ as a wave being converted and to take out both or either of converted beams having wavelengths $\omega_1$ and $\omega_2$, these frequencies having a relationship $\omega_3=\omega_1+\omega_2$, as explained before with reference to the formulas (7) to (11). The phase matching condition is that the sum of two wave vectors which correspond to the frequencies $\omega_1$ and $\omega_2$, respectively, is equal to the wave vector which corresponds to the frequency $\omega_3$.

It is only in that the wavelength of a wave being converted is shorter than the wavelength of the converted wave that the phase matching of an OPO system is different from the phase matching of a SHG system. According to the present invention, it is possible to satisfy the phase matching conditions by similar means as those in the above-described embodiments suitable for phase matching of an SHG system ordinarily without utilizing the double refraction of an optical crystal. In the case of an OPO system, however, a nonlinear optical medium is ordinarily disposed in a resonator system having the same frequency as that of a converted beam and the converted beam generated in the optical medium is taken out after amplification in order to enhance the wavelength conversion efficiency.

As already described with reference to FIG. 4, in that embodiment a conical lens is used as the wave front conversion means 40 in the same way as in the embodiment shown in FIG. 1. The FIG. 4 embodiment is characterized in that the end surface 70a on the light receiving side of the nonlinear optical medium 70 is subjected to wavelength-selective coating which has a transmittance with respective to the laser beam, but a high reflectivity with respect to the converted beam, and a partial reflection output mirror 18 is disposed so as to face the end surface 70b on the light emitting side. A converted beam generated in the optical medium 70 is amplified by the resonator system between the end surface 70a and the output mirror 18 and thereafter taken out as beam 31.

In such wavelength conversion of an OPO system, when the wavelength of the laser beam, which is a beam being converted, is 1.06 um, both or either of converted output beams having wavelengths of, e.g., 3.00 µm and 1.64 µm are generated. The wavelength of the converted output beam is naturally set by selecting a resonance frequency of the resonator system by finely adjusting the distance between the output mirror 18 and the nonlinear optical medium 70. Wavelength conversion of an SHG system is preferably performed under the phase matching condition of a phase of 90°, as described above, but wavelength conversion of an OPO system is preferably performed in both phase matching conditions of phase of 90° and 0° relative to the optical axis of the optical crystal.

FIG. 21 is an embodiment of a wavelength converting apparatus of an OPO system as an additional embodiment of the present invention. This embodiment corresponds generally to the embodiment shown in FIG. 19, described below. A combination of the wavefront divergence means 51 and the wavefront convergence means 60 is used in the same way as in the embodiment shown in FIG. 19. The FIG. 21 embodiment is characterized in that a resonator system is composed by utilizing the end surface 73a of the nonlinear optical medium 73 for receiving the laser beam 20 as a beam being converted and the end surface 73b on the light emitting side as a reflection mirror with respect to the converted beam 31, and that the resonator has a frequency the same as, e.g., the shorter wavelength 1.64 µm of the two wavelengths of the above-described possible beams.

In order to produce such a resonator system, both end surfaces (receiving surface 73a and emitting surface 73b) of the nonlinear optical medium 73 are subjected to wavelength-selective coating such that they have a high transmittance with respect to the laser beam 20 but the former has a high reflectivity and the latter has a reflectivity of, for example, 90% with respect to the converted beam 31. Thus, both have substantial reflectivity, but emitting surface 73b has a reflectivity less than the high reflectivity of receiving surface 73a. Alternatively, it will be apparent from FIG. 4 that the end surface 73b on the light emitting side may be a reflecting mirror and that a partial reflection output mirror 18 may be so disposed as to face the reflecting mirror in the same way as in the embodiment shown in FIG. 4, so as to facilitate the fine adjustment of the resonator system and the selection of the wavelength of the converted beam. The end surface 73b on the light emitting side is preferably formed into a convex spherical surface in the FIG. 21 embodiment, thereby stabilizing the resonance of the resonator system. In the embodiment shown in FIG. 21 having the above-described structure, the converted beam 31 is taken out of the end surface 73b on the light emitting side which has been subjected to 90% reflection coating as described with reference to FIG. 4.

The frequency $\omega_1$ or $\omega_2$ of the converted beam generated which satisfies the relationship $\omega_3=\omega_1+\omega_2$ chiefly depends upon the state of phase matching in addition to the resonating state of the resonator system.

Accordingly, in the embodiment shown in FIG. 4, it is possible to continuously control the frequency of the converted beam generated by varying the phase matching conditions by the temperature control of the nonlinear optical medium 70. Similarly, in the embodiment shown in FIG. 21, it is possible to continuously control the frequency of the converted beam by varying the frequency which satisfies the phase matching condition by using adjusting means 52 to change the spacing between the wave surface conversion means 51 and the converging means 60 so as to adjust the angle of projection of the laser beam 20 with respect to the nonlinear optical medium 73. The embodiment shown in FIG. 21 is more advantageous than the embodiment shown in FIG. 4 in that the wavelength of the converted beam can be controlled more freely and frequently and in a wider range.

Although the present invention has been explained with reference to the above-described embodiments but it is not restricted thereto and various modifications are possible within the scope of the invention. For example, the wavefront convergence means is a type of wave front conversion means, so that not only a lens but also an optical means such as a mirror is usable as appropriate in different applications. It will be understood that even if it is restricted to a lens, the light receiving surface may be flat and the converging surface is not restricted to a spherical surface but may have another shape such as a conical surface, as desired.

As described, according to the present invention, a wavelength conversion device may include a wavefront conversion means for converting a laser light beam projected from a laser beam generating means into a convergent laser light beam having a conical wave surface, and a nonlinear optical medium for receiving the converted laser light beam such that the laser beam is converged therewithin. As a result, the laser beam which is received by the nonlinear optical medium and the wavelength of which is converted under a nonlinear matching condition is extracted from the nonlinear optical medium. In alternative embodiments a wave front conversion device includes divergence means for first converting a laser light beam projected from a laser beam generating means into a divergent laser light beam having an annular wave front. Convergence means for converging the divergent laser light beam are then provided at an adjustable distance from the divergence means and arranged to cooperate with a nonlinear optical medium for receiving the converted laser light beam such that the laser beam light beam is converged therewithin. As a result, the laser beam which is received by the nonlinear optical medium and the wavelength of which is converted under a nonlinear matching condition is extracted from the nonlinear optical medium. Thus, it is possible to enhance the wavelength conversion efficiency while satisfying the phase matching conditions between the fundamental wave and the high harmonic wave, or the beam being converted and the converted beam, in the nonlinear optical medium much more readily and with much more reliability than in the prior art.

This will be explained with the case of an SHG system cited as an example. If it is assumed that the angle of projection of a fundamental wave onto a nonlinear optical medium is $\alpha$, the refractive index of the fundamental wave with respect to an ordinary ray is $n_{1o}$, and the refractive indexes of the fundamental wave with respect to the second high harmonic wave with respect to an extraordinary ray in the direction of an optical axis and in the direction of 90° therefrom are $n_{1e}$ and $n_{2e}$, respectively, the phase matching condition of type I is $$\cos\alpha = n_{2e}/n_{1o}$$

and the phase matching condition of type II is $$\cos\alpha = 2n_{2e}/(n_{1o}+n_{1e})$$

in the present invention. In a conventional wavelength converting method, since $\alpha=0$ and $\cos\alpha=1$, it is necessary to equalize the numerator and the denominator in each of the above formulas, to select a nonlinear optical medium which substantially satisfies the conditions for these refractive indexes, to raise the temperature of the nonlinear optical medium to not lower than 150° C. and to precisely control the temperature in order to establish phase matching. In contrast, according to the present invention, the above-described conditions are easily satisfied by setting the convergent angle of the wave surface conversion means with respect to the fundamental wave or setting the angle $\alpha$ of projection by adjusting the gap between the wave surface conversion means and the converging means.

As is obvious from the above explanation, the present invention produces the following advantages, for example:

(a) a variety of optical crystals can be utilized for wavelength conversion;

(b) wavelength conversion is made practical at or near room temperature;

(c) temperature control is simplified or dispensed with; and (d) the wavelength conversion efficiency is enhanced by appropriately selecting the angle of projection onto a nonlinear optical medium.

Especially when the present invention is applied to wavelength conversion of an OPO system, since phase matching is enabled without using double refraction, a high wavelength conversion efficiency is achieved by making the best use of the properties which various optical crystals have.

In the case of performing wavelength conversion by utilizing the double refraction of an optical crystal, it is necessary to generate polarization in the direction perpendicular to the direction of polarization of a fundamental wave in order to use the fundamental wave as a ordinary ray and a converted wave as an extraordinary ray. Therefore, as is clear from the formula (2), it is impossible to utilize for wavelength conversion the diagonal constant $d_{11}$ such as $d_{11}$ and $d_{22}$ in the matrix of the secondary nonlinear optical constant of an optical crystal. The diagonal constant $d_{11}$, however, is much larger than the other constants. For example, in MNA (2-methyl-4-nitroaniline) which has recently attracted public attention as having a large nonlinear optic constant, the value of $d_{11}$ is 8.6 times as large as that of $d_{12}$. In the present invention, since it is unnecessary to utilize double refraction, it is possible to achieve a high efficiency wavelength conversion by utilizing a diagonal constant having such a large nonlinear optical constant which cannot be effectively utilized in the prior art. Furthermore, it is also possible to utilize optical crystals such as tellurium and gallium arsenic which have not been used in the past because they do not produce double refraction although they have a large nonlinear optical constant.

I claim:

1. A wavelength conversion device including a resonator arrangement, comprising:

first means for providing an optical frequency electromagnetic beam having a principal first wavelength;

a nonlinear optical medium;

wave front conversion means coupled to said beam, including in spaced relationship wave front divergence means for converting said beam into an annularly diverging beam and wave front convergence means for converting said diverging beam into a converging beam, for converging said beam into said nonlinear optical medium to provide an output beam which has undergone wavelength conversion, wherein said output beam has a principal output wavelength which is greater than the principal first wavelength; and a resonator arrangement including spaced wavelength-selective surfaces having a high transmittance in a first frequency range and substantial reflectivity in a second frequency range.

2. A wavelength conversion device as described in claim 1, wherein said spaced surfaces are the end surfaces of said nonlinear optical medium.

3. A wavelength conversion device as described in claim 1, wherein said surfaces are the end surfaces of said nonlinear optical medium, the receiving surface of said optical medium has high transmittance for said beam provided by said first means and high reflectivity for said output beam, and the emitting surface of said optical medium has high transmittance for said beam provided by said first means and reflectivity less than said high reflectivity for said output beam.

4. A wavelength conversion device as described in claim 1, wherein the reflectivity of said emitting surface of said optical medium has a reflectivity of approximately 90% for said output beam.

5. A wavelength conversion device as described in claim 3, wherein said first means includes a laser for providing a beam of light.

6. A wavelength conversion device as described in claim 3, wherein said optical medium is an optical crystal.

7. A wavelength conversion device as described in claim 3, additionally comprising means for adjusting the separation between said divergence means and convergence means.

8. A wavelength conversion device as described in claim 1, wherein said first means includes a laser for providing a beam of light.

9. A wavelength conversion device as described in claim 1, wherein said optical medium is an optical crystal.

10. A wavelength conversion device as described in claim 1, additionally comprising means for adjusting the separation between said divergence means and convergence means.

11. A wavelength conversion device including a resonator arrangement comprising:

first means for providing an optical frequency electromagnetic beam;

a nonlinear optical medium;

wave front conversion means coupled to said beam, including in spaced relationship wave front divergence means for converting said beam into an annularly diverging beam and wave front convergence means for converting said diverging beam into a converging beam, for converging said beam into said nonlinear optical medium to provide an output beam which has undergone wavelength conversion; and a resonator arrangement including spaced wavelength-selective surfaces having a high transmittance in a first frequency range and substantial reflectivity in a second frequency range, wherein said wavefront divergence means is a lens with a concave curved beam receiving surface and a convex conical beam emitting surface.

12. A wavelength conversion device including a resonator arrangement, comprising:

first means for providing an optical frequency electromagnetic beam;

a nonlinear optical medium;

wave front conversion means coupled to said beam, including in spaced relationship wave front divergence means for converting said beam into an annularly diverging beam and wave front convergence means for converting said diverging beam into a converging beam, for converging said beam into said nonlinear optical medium to provide an output beam which has undergone wavelength conversion; and a resonator arrangement including spaced wavelength-selective surfaces having a high transmittance in a first frequency range and substantial reflectivity in a second frequency range, wherein said wave front divergence means comprises a lens with at least one conical surface.

13. A wavelength conversion device as described in claim 12, wherein said lens has a flat receiving surface.

14. A wavelength conversion device as described in claim 12, wherein said lens has a concave spherical receiving surface.

15. A wavelength conversion device including a resonator arrangement, comprising:

first means for providing an optical frequency electromagnetic beam;

a nonlinear optical medium;

wave front conversion means coupled to said beam, including in spaced relationship wave front divergence means for converting said beam into an annularly diverging beam and wave front convergence means for converting said diverging beam into a converging beam, for converging said beam into said nonlinear optical medium to provide an output beam which has undergone wavelength conversion; and a resonator arrangement including spaced wavelength-selective surfaces having a high transmittance in a first frequency range and substantial reflectivity in a second frequency range, wherein said convergence means comprises a lens with at least one conical surface.

16. A wavelength conversion device as described in claim 15, wherein said lens has a flat receiving surface.

17. A wavelength conversion device as described in claim 15, wherein said lens has a convex conical receiving surface.

18. A wavelength conversion device as described in claim 15, wherein said lens has a convex spherical beam emitting surface.

* * * * *

UNITED STATES PATENT AND TRADEMARK OFFICE
CERTIFICATE OF CORRECTION

PATENT NO. : 5,541,765
DATED : July 30, 1996
INVENTOR(S) : Ryohei Tanuma

It is certified that error appears in the above-indentified patent and that said Letters Patent is hereby corrected as shown below:

<u>Column 5, following line 50</u>, after "below.", insert --$k_\omega$ and $k_{2\omega}$ are expressed by:--;

<u>Column 20, bridging lines 64-65</u>, "claim 1" should read --claim 3--.

Signed and Sealed this

Eighteenth Day of March, 1997

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,541,765
DATED : July 30, 1996
INVENTOR(S) : Ryohei Tanuma

It is certified that error appears in the above-indentified patent and that said Letters Patent is hereby corrected as shown below:

On title page, item [73] Assignee:
add, --Fuji Electric Co., Ltd., Kawasaki, Japan--

Signed and Sealed this

Ninth Day of September, 1997

Attest:

BRUCE LEHMAN

Attesting Officer

Commissioner of Patents and Trademarks